US009296908B2

(12) United States Patent
Koike et al.

(10) Patent No.: US 9,296,908 B2
(45) Date of Patent: Mar. 29, 2016

(54) AQUEOUS INKJET INK COMPOSITION

(75) Inventors: Takaaki Koike, Tokyo (JP); Sachiko Kinoshita, Tokyo (JP); Yoshiyuki Sakai, Tokyo (JP); Akiko Nishina, Tokyo (JP); Masayoshi Utsugi, Tokyo (JP); Yukitoshi Takahashi, Tokyo (JP); Atsushi Yoda, Tokyo (JP); Masahiro Sugihara, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 456 days.

(21) Appl. No.: 13/699,965

(22) PCT Filed: May 26, 2011

(86) PCT No.: PCT/JP2011/062111
§ 371 (c)(1),
(2), (4) Date: Nov. 26, 2012

(87) PCT Pub. No.: WO2011/149022
PCT Pub. Date: Dec. 1, 2011

(65) Prior Publication Data
US 2013/0079447 A1    Mar. 28, 2013

(30) Foreign Application Priority Data

May 26, 2010 (JP) .................. 2010-119960
Mar. 22, 2011 (JP) .................. 2011-062918

(51) Int. Cl.
C09D 11/30 (2014.01)
C09D 11/322 (2014.01)
C09D 11/106 (2014.01)

(52) U.S. Cl.
CPC ............. *C09D 11/30* (2013.01); *C09D 11/106* (2013.01); *C09D 11/322* (2013.01)

(58) Field of Classification Search
CPC .... C09D 11/00; C09D 11/322; C09D 11/106; C09D 11/30; C09D 11/38; C09D 125/08; B41J 2/01; B41M 5/00
USPC ....................................................... 524/377
See application file for complete search history.

(56) References Cited

U.S. PATENT DOCUMENTS

| 7,381,755 | B2 * | 6/2008 | Wang et al. .................. 523/160 |
| 2002/0120034 | A1 | 8/2002 | Watanabe et al. |
| 2003/0125414 | A1 | 7/2003 | Nakajima et al. |
| 2003/0144378 | A1 | 7/2003 | Mizushima et al. |
| 2004/0092623 | A1 | 5/2004 | Hesler et al. |
| 2004/0189764 | A1 | 9/2004 | Aono et al. |
| 2004/0229974 | A1 | 11/2004 | Miyabayashi |
| 2005/0075416 | A1 | 4/2005 | Miyabayashi |
| 2005/0137319 | A1 | 6/2005 | Vincent et al. |
| 2006/0052480 | A1 | 3/2006 | Mizushima et al. |
| 2006/0052514 | A1 | 3/2006 | Nakajima et al. |
| 2006/0100307 | A1 * | 5/2006 | Uerz et al. ................... 523/160 |
| 2008/0255298 | A1 | 10/2008 | Watanabe et al. |

FOREIGN PATENT DOCUMENTS

| CN | 1428382 A | 7/2003 |
| CN | 1740244 A | 3/2006 |
| JP | 2003 3101 | 1/2003 |
| JP | 2005 97476 | 4/2005 |
| JP | 2005 179678 | 7/2005 |
| JP | 2006 301307 | 11/2006 |
| JP | 3937170 | 6/2007 |
| JP | 2007 197640 | 8/2007 |
| JP | 2008 74887 | 4/2008 |
| JP | 4079339 | 4/2008 |
| WO | 02 31010 | 4/2002 |

OTHER PUBLICATIONS

Combined Chinese Office Action and Search Report issued Oct. 30, 2013 in Patent Application No. 201180025201.1 with English Translation.
International Preliminary Report on Patentability issued Dec. 4, 2012 in PCT/JP11/62111 Filed May 26, 2011.
International Search Report Issued Jun. 21, 2011 in PCT/JP11/06211 Filed May 26, 2011.
Office Action issued May 7, 2014, in Chinese Patent Application No. 201180025201.1 with English translation.
Office Action issued on Dec. 2, 2014 in Japanese Patent Application No. 2012-517314 with English translation.
Office Action issued Aug. 7, 2015, in Chinese Patent Application No. 201180025201.1 filed May 26, 2011 (with English translation).
Office Action issued Sep. 1, 2014 in Chinese Patent Application No. 201180025201.1 (with English language translation).
Extended European Search Report issued Aug. 20, 2014 in Patent Application No. 11786721.8.
Reexamination Decision issued Dec. 24, 2015, in Chinese Patent Application No. 201180025201.1 filed May 26, 2011.

* cited by examiner

*Primary Examiner* — Nathan M Nutter
(74) *Attorney, Agent, or Firm* — Oblon, McClelland, Maier & Neustadt, L.L.P.

(57) ABSTRACT

An aqueous inkjet ink composition comprising a pigment, a pigment-dispersing resin, resin fine particles (A), water, and hydrophilic solvents (B), the resin fine particles (A) being formed by emulsion polymerizing ethylenically unsaturated monomers including: 20% to 80% by weight of an aromatic ethylenically unsaturated monomer (C) that does not have an ionic functional group; 0.6% to 6% by weight of water-soluble ethylenically unsaturated monomers (F) consisting of 0.5% to 3% by weight of a sulfonic acid group-containing ethylenically unsaturated monomer (D) and 0.1% to 3% by weight of a nonionic water-soluble ethylenically unsaturated monomer (E); and 0.1% to 10% by weight of a crosslinkable ethylenically unsaturated monomer (G), and the hydrophilic solvents (B) including a glycol-based solvent (H) and an ethylene glycol ether-based solvent (I) is provided.

5 Claims, No Drawings

AQUEOUS INKJET INK COMPOSITION

TECHNICAL FIELD

The present invention relates to an aqueous inkjet ink composition.

BACKGROUND ART

An aqueous inkjet ink is generally composed of a pigment, a pigment-dispersing resin, water, a hydrophilic solvent (a humectant, a penetrating agent), and a binder resin. Among these, the binder resin is used for the purpose of enhancing the coating film durability of printed materials. In the case of inkjet, it is also necessary to take the ejection property of the ink into consideration at the same time. In many cases, resin fine particles that have low viscosity even at high solids content are used as the binder to a large extent. In order to maintain the ejection stability or storage stability of the ink, and also to promote an enhancement of the coating film durability of printed materials, various resin fine particles have been reported.

Patent Literature 1 discloses an aqueous inkjet ink composition which has a charge of the same polarity as that of a colorant, characterized in that the glass transition temperature (Tg) of the resin emulsion is 35° C. or higher, and the minimum film-forming temperature (MFT) is 20° C. or lower. However, the stability of the resin fine particles against the hydrophilic solvent that is included in the ink solvent is not fully taken into consideration, and there is a problem with the ejection stability or storage stability of the ink composition.

Patent Literature 2 discloses an aqueous inkjet ink composition characterized in that the glass transition temperature (Tg) of the resin fine particles is 40° C. to 80° C., and the ink composition contains a water-soluble surface agent selected from the group consisting of monoalkyl ethers of alkylene glycols, 2-pyrrole, N-methylpyrrolidone, and sulfolane. For this ink composition as well, the resin composition is not taken into consideration, and it is difficult to realize excellent ejection stability of the ink composition, based only on the glass transition temperature of the resin and the solvent composition. Furthermore, it is also inappropriate to say that the ink composition has satisfactory storage stability.

Patent Literature 3 discloses an aqueous inkjet ink composition characterized by including sulfonic acid group-containing resin fine particles, an acetylene glycol-based penetration enhancer, and triethylene glycol monobutyl ether. However, it is not feasible to achieve sufficiently both the storage stability of the ink composition and the coating film durability of printed materials, only by the fact that the resin fine particles have sulfonic acid groups.

There has been hitherto a demand for an aqueous inkjet ink composition which is excellent in the storage stability and ejectability of the ink, printing suitability of printed materials, gloss, brightness, and coating film properties (adhesiveness, scratch resistance, water resistance, and solvent resistance).

CITATION LIST

Patent Literature

Patent Literature 1: JP 4079339 B1
Patent Literature 2: JP 3937170 B1
Patent Literature 3: JP 3982235 B1

SUMMARY OF INVENTION

A first embodiment relates to an aqueous inkjet ink composition including a pigment, a pigment-dispersing resin, resin fine particles (A), water, and hydrophilic solvents (B), in which the resin fine particles (A) are formed by emulsion polymerizing ethylenically unsaturated monomers including 20% to 80% by weight of an aromatic ethylenically unsaturated monomer (C) that does not have an ionic functional group; 0.6% to 6% by weight of water-soluble ethylenically unsaturated monomers (F) consisting of 0.5% to 3% by weight of a sulfonic acid group-containing ethylenically unsaturated monomer (D) and 0.1% to 3% by weight of a nonionic water-soluble ethylenically unsaturated monomer (E); and 0.1% to 10% by weight of a crosslinkable ethylenically unsaturated monomer (G), and the hydrophilic solvents (B) include a glycol-based solvent (H) and an ethylene glycol ether-based solvent (I).

Furthermore, a second embodiment relates to the aqueous inkjet ink composition of the first embodiment, in which the sulfonic acid group-containing ethylenically unsaturated monomer (D) is a styrenesulfonic acid group-containing ethylenically unsaturated monomer.

Furthermore, a third embodiment relates to the aqueous inkjet ink composition of the first or second embodiment, in which the crosslinkable ethylenically unsaturated monomer (G) is an alkoxysilyl group-containing ethylenically unsaturated monomer or a monomer having two or more allyl groups.

Furthermore, a fourth embodiment relates to the aqueous inkjet ink composition of any one of the first to the third embodiments, in which an average particle size of the resin fine particles (A) is 60 nm to 250 nm.

Furthermore, a fifth embodiment relates to the aqueous inkjet ink composition of any one of the first to the fourth embodiments, in which a glass transition temperature of the resin fine particles (A) is 40° C. to 120° C.

Furthermore, a sixth embodiment relates to the aqueous inkjet ink composition of any one of the first to the fifth embodiments, in which a viscosity of an aqueous dispersion of the resin fine particles (A) measured under conditions of a temperature of 25° C. and a solid concentration of 40% by weight is 5 mPa·s to 200 mPa·s.

Furthermore, a seventh embodiment relates to the aqueous inkjet ink composition of any one of the first to the sixth embodiments, in which the amount of coarse particles having a particle size of 1 μm or greater in an aqueous dispersion liquid of the resin fine particles (A) at a solid concentration of 30 ppm is $4 \times 10^4$ particles/cm$^3$ or less.

According to the embodiments, an aqueous inkjet ink composition which is excellent in the storage stability and ejectability of the ink, printing suitability of the printed materials, gloss, brightness, and coating film durability (adhesiveness, scratch resistance, water resistance, and solvent resistance) can be provided.

The disclosure of the present specification relates to the subject matters that are included in JP 2010-119960 A (filed on May 26, 2010) and JP 2011-062918 A (filed on Mar. 22, 2011), the entire disclosures of which are incorporated herein by reference.

DESCRIPTION OF EMBODIMENTS

A specific example of the aqueous inkjet ink composition comprises a pigment-dispersing resin, resin fine particles (A), water, and hydrophilic solvents (B), in which the resin fine particles (A) are formed by emulsion polymerizing ethylenically unsaturated monomers including 20% to 70% by weight of an aromatic ethylenically unsaturated monomer (C) that does not have an ionic functional group; 0.6% to 6% by weight of water-soluble ethylenically unsaturated monomers (F) consisting of 0.5% to 3% by weight of a sulfonic acid group-containing ethylenically unsaturated monomer (D) and 0.1% to 3% by weight of a nonionic water-soluble ethylenically unsaturated monomer (E); and 0.1% to 10% by weight of a crosslinkable ethylenically unsaturated monomer (G), and the hydrophilic solvents (B) include a glycol-based solvent (H) and an ethylene glycol ether-based solvent (I).

First, the resin fine particles (A) will be described.

The resin fine particles (A) may be obtained by emulsion polymerizing an aromatic ethylenically unsaturated monomer (C) that does not have an ionic functional group, water-soluble ethylenically unsaturated monomers (F), and a crosslinkable ethylenically unsaturated monomer (G) by using a radical polymerization initiator.

The aromatic ethylenically unsaturated monomer (C) that does not have an ionic functional group is a monomer which has a function of stabilizing particle nucleation in the early stage of emulsion polymerization. This is preferably a monomer having at least one aromatic group, and one ethylenically unsaturated bond in the structure.

Specific examples of the ionic functional group include, as anionic functional groups, a carboxyl group, a phosphoric acid group, a sulfonic acid group, and salts thereof; and as cationic functional groups, an amino group, salts thereof, and quaternary ammonium salt groups.

Examples of the aromatic ethylenically unsaturated monomer (C) that does not have an ionic functional group include styrene, α-methylstyrene, o-methylstyrene, p-methylstyrene, m-methylstyrene, vinylnaphthalene, benzyl acrylate, benzyl methacrylate, phenoxyethyl acrylate, phenoxyethyl methacrylate, phenoxydiethylene glycol acrylate, phenoxydiethylene glycol methacrylate, phenoxytetraethylene glycol acrylate, phenoxytetraethylene glycol methacrylate, phenoxyhexaethylene glycol acrylate, phenoxyhexaethylene glycol methacrylate, phenyl acrylate, and phenyl methacrylate.

Among those described above, from the viewpoint of stability at the time of polymerization, styrene, α-methylstyrene, benzyl acrylate, benzyl methacrylate, phenoxyethyl acrylate, phenoxyethyl methacrylate, and vinylnaphthalene are preferred.

In 100% by weight of the total amount of the ethylenically unsaturated monomers used to obtain the resin fine particles (A), the content of the aromatic ethylenically unsaturated monomer (C) that does not have an ionic functional group is 20% to 80% by weight, and preferably 20% to 70% by weight. If the content is less than 20% by weight, the particle nucleation at the time of emulsion polymerization is unstably achieved, and the generation of coarse particles and aggregates that exert effects on the ejection stability of the ink composition occurs to a large extent. Furthermore, the low content also adversely affects the gloss or brightness of printed materials. Also, if the content is greater than 80% by weight, particle nucleation is unstabilized, and large amounts of coarse particles and aggregates are generated. Furthermore, the stability over time of the resin fine particles (A) in the glycol-based solvent (H) and the ethylene glycol ether-based solvent (I) is decreased, and thereby, the viscosity of the ink composition is increased.

The term "coarse particles" as used herein means resin fine particles having a particle size of 1 μm or greater as measured by a particle number counting method. If the amount of coarse particles is large, the coarse particles cause nozzle clogging, and ejectability of the ink is markedly deteriorated.

The water-soluble ethylenically unsaturated monomers (F) are monomers each having one ethylenically unsaturated bond in the structure, and consist of a sulfonic acid group-containing ethylenically unsaturated monomer (D) and a nonionic water-soluble ethylenically unsaturated monomer (E). Due to the synergistic effect of the excellent ion dissociability of the sulfonic acid group-containing ethylenically unsaturated monomer (F) and the steric repulsion of the hydrophilic moieties of the nonionic water-soluble ethylenically unsaturated monomer (E), the generation of coarse particles or aggregates at the time of emulsion polymerization is suppressed to a large extent. Furthermore, since the resin fine particles (A) thus obtainable have excellent re-solubility, nozzle clogging at the head does not easily occur. Moreover, even in an aqueous medium including large amounts of the glycol-based solvent (H) and the ethylene glycol ether-based solvent (I), the resin fine particles (A) can exist stably over time without damaging the dispersion state.

The term "water-soluble" as used herein means that the amount of the ethylenically unsaturated monomer that dissolves in 1 L of water at 25° C. is 10 g or greater.

Meanwhile, in the present specification, it is defined that a sulfonic acid group-containing monomer in which the sulfonic acid group has been neutralized by a basic substance or the like and has adopted a salt structure, is also included in the sulfonic acid group-containing ethylenically unsaturated monomer (D).

The sulfonic acid group-containing ethylenically unsaturated monomer (D) is preferably a monomer having one or more sulfonic acid groups and one ethylenically unsaturated bond. Examples thereof include styrenesulfonic acid, sodium styrenesulfonate, ammonium styrenesulfonate, lithium styrenesulfonate, 2-acrylamido-2-methylpropanesulfonic acid, sodium 2-acrylamido-2-methylpropanesulfonate, methallylsulfonic acid, sodium methallylsulfonate, allylsulfonic acid, sodium allylsulfonate, ammonium allylsulfonate, vinylsulfonic acid, allyloxybenzenesulfonic acid, sodium allyloxybenzenesulfonate, and ammonium allyloxybenzenesulfonate.

In 100% by weight of the total amount of the ethylenically unsaturated monomers used to obtain the resin fine particles (A), the content of the sulfonic acid group-containing ethylenically unsaturated monomer (D) is 0.5% to 3% by weight, and preferably 0.5% to 1.5% by weight. If the content is less than 0.5% by weight, the dispersion stability of the resin fine particles (A) in the ink composition is decreased. If the content is greater than 3% by weight, aggregates are generated at the time of emulsion polymerization, the ejection stability of the ink composition is adversely affected, and also, the water resistance and solvent resistance of printed materials are deteriorated. Furthermore, printing suitability is also decreased.

Among the sulfonic acid group-containing ethylenically unsaturated monomers listed above, it is preferable that the sulfonic acid group-containing ethylenically unsaturated monomer (D) contains a styrenesulfonic acid group. When an ethylenically unsaturated monomer including a styrenesulfonic acid group is used, the particle core component of the resin fine particles (A) is more stabilized, and therefore, the generation of coarse particles or aggregates that bring about adverse effects on ejectability is further suppressed, while the storage stability of the ink composition is also enhanced.

Examples of the ethylenically unsaturated monomer containing a styrenesulfonic acid group include styrenesulfonic acid, sodium styrenesulfonate, ammonium styrenesulfonate, and lithium styrenesulfonate.

The nonionic water-soluble ethylenically unsaturated monomer (E) is preferably a monomer having at least one nonionic water-soluble substituent, and one ethylenically unsaturated bond in the structure. Examples thereof include: amide group-containing ethylenically unsaturated monomers such as (meth)acrylamide, N-methoxymethyl(meth)acrylamide, N-ethoxymethyl(meth)acrylamide, N-propoxymethyl (meth)acrylamide, N-butoxymethyl(meth)acrylamide, N-pentoxymethyl(meth)acrylamide, N,N-di(methoxymethyl)acrylamide, N-ethoxymethyl-N-methoxymethylmethacrylamide, N,N-di(ethoxymethyl)acrylamide, N-ethoxymethyl-N-propoxymethylmethacrylamide, N,N-di(propoxymethyl)acrylamide, N-butoxymethyl-N-(propoxymethyl)methacrylamide, N,N-di(butoxymethyl)acrylamide, N-butoxymethyl-N-(methoxymethyl)methacrylamide, N,N-di(pentoxymethyl)acrylamide, N-methoxymethyl-N-(pentoxymethyl)methacrylamide, N,N-dimethylaminopropylacrylamide, N,N-diethylaminopropylacrylamide, N,N-dimethylacrylamide, N,N-diethylacrylamide, and diacetone (meth)acrylamide;

hydroxyl group-containing ethylenically unsaturated monomers such as 2-hydroxyethyl(meth)acrylate, 2-hydroxypropyl(meth)acrylate, 4-hydroxybutyl(meth)acrylate, glycerol mono(meth)acrylate, and allyl alcohol; and polyethylene oxide group-containing ethylenically unsaturated monomers such as polyethylene glycol mono(meth)acrylate (manufactured by NOF Corp., BLENMER PE-90, 200, 350, 350 G, AE-90, 200, 400, and the like), polyethylene glycol-polypropylene glycol mono(meth)acrylate (manufactured by NOF Corp., BLENMER 50PEP-300, 70PEP-350, and the like), and methoxypolyethylene glycol mono(meth)acrylate (manufactured by NOF Corp., BLENMER PME-400, 550, 1000, 4000, and the like), but the examples are not intended to be limited to these in particular. These can be used singly or in combination of two or more kinds.

Among those described above, from the viewpoint of stability at the time of polymerization, (meth)acrylamide, 2-hydroxyethyl(meth)acrylate, polyethylene glycol mono(meth)acrylate, and methoxypolyethylene glycol mono(meth)acrylate are preferred.

In 100% by weight of the total amount of the ethylenically unsaturated monomers used to obtain the resin fine particles (A), the content of the nonionic water-soluble ethylenically unsaturated monomer (E) is 0.1% to 3% by weight, and preferably 0.1% to 1.5% by weight. If the content is less than 0.1% by weight, the dispersion stability of the resin fine particles (A) in the ink composition is decreased. If the content is greater than 3% by weight, the resin fine particles (A) increase the viscosity, and bring about adverse effects on the ejectability of the ink. Furthermore, the water resistance and solvent resistance of printed materials are also decreased.

In regard to the water-soluble ethylenically unsaturated monomers (F) as a whole, the content is 0.6% to 6% by weight, and preferably 0.6% to 3.0% by weight, in 100% by weight of the total amount of the ethylenically unsaturated monomers used to obtain the resin fine particles (A). If the content is less than 0.6% by weight, the dispersion stability of the resin fine particles (A) in the ink composition is decreased. If the content is greater than 6% by weight, the resin fine particles (A) increase the viscosity, and bring about adverse effects on the ejectability of the ink. Furthermore, the water resistance and solvent resistance of printed materials are also decreased.

The crosslinkable ethylenically unsaturated monomer (G) has a function of further enhancing the stability of the resin fine particles (A) in the ink composition through crosslinking of the interior of the resin fine particles.

Examples of the crosslinkable ethylenically unsaturated monomer (G) include: ethylenically unsaturated monomers each having two or more ethylenically unsaturated groups, such as allyl(meth)acrylate, vinyl(meth)acrylate, ethylene glycol di(meth)acrylate, diethylene glycol di(meth)acrylate, triethylene glycol di(meth)acrylate, polyethylene glycol (meth)acrylate, 1,4-butanediol di(meth)acrylate, 1,6-hexanediol di(meth)acrylate, 1,9-nonanediol di(meth)acrylate, 1,10-decanediol di(meth)acrylate, neopentyl glycol di(meth)acrylate, glycerin dimethacrylate, dimethyloltricyclodecane di(meth)acrylate, trimethylolpropane tri(meth)acrylate, pentaerythritol tri(meth)acrylate, pentaerythritol tetra(meth)acrylate, divinylbenzene, divinyl adipate, diallyl isophthalate, diallyl phthalate, and diallyl maleate;

alkoxysilyl group-containing ethylenically unsaturated monomers such as γ-methacryloxypropyltrimethoxysilane, γ-methacryloxypropyltriethoxysilane, γ-methacryloxypropyltributoxysilane, γ-methacryloxypropylmethyldimethoxysilane, γ-methacryloxypropylmethyldiethoxysilane, γ-acryloxypropyltrimethoxysilane, γ-acryloxypropyltriethoxysilane, γ-acryloxypropylmethyldimethoxysilane, γ-methacryloxymethyltrimethoxysilane, γ-acryloxymethyltrimethoxysilane, vinyltrimethoxysilane, vinyltriethoxysilane, vinyltributoxysilane, and vinylmethyldimethoxysilane; and methylol group-containing ethylenically unsaturated monomers such as N-methylol(meth)acrylamide, N,N-dimethylol(meth)acrylamide, and alkyl etherified N-methylol (meth)acrylamide, but the examples are not intended to be limited to these in particular. These can be used singly or in combination of two or more kinds.

The content of the crosslinkable ethylenically unsaturated monomer (G) is 0.1% to 10% by weight, and preferably 0.4% to 8.0% by weight, in 100% by weight of the total amount of the ethylenically unsaturated monomers used to obtain the resin fine particles (A). If the content is less than 0.1% by weight, ejection stability and storage stability of the ink composition are deteriorated. On the other hand, if the content is greater than 10% by weight, the film forming properties of the resin fine particles are deteriorated, and the scratch resistance and solvent resistance of printed materials are decreased. Furthermore, the excessively large content also adversely affects the printing suitability, gloss, and brightness of printed materials.

Among the crosslinkable ethylenically unsaturated monomers described above, it is preferable that the crosslinkable ethylenically unsaturated monomer (G) be an alkoxysilyl group-containing ethylenically unsaturated monomer, or a monomer having two or more allyl groups. In general, if a crosslinkable ethylenically unsaturated monomer is used, the stability of the resin fine particles in the ink composition increases, but the film forming properties at the time of drying tend to slightly decrease. However, these crosslinkable ethylenically unsaturated monomers hardly decrease the film forming properties of the resin fine particles at the time of drying, and can enhance the stability of the resin fine particles in an ink composition which contains the glycol-based solvent (H) and the ethylene glycol ether-based solvent (I).

Examples of the alkoxysilyl group-containing ethylenically unsaturated monomer include γ-methacryloxypropyltrimethoxysilane, γ-methacryloxypropyltriethoxysilane, γ-methacryloxypropyltributoxysilane, γ-methacryloxypropylmethyldimethoxysilane, γ-methacryloxypropylmethyldiethoxysilane, γ-acryloxypropyltrimethoxysilane, γ-acryloxypropyltriethoxysilane, γ-acryloxypropylmethyldimethoxysilane, γ-methacryloxymethyltrimethoxysilane, γ-acryloxymethyltrimethoxysilane, vinyltrimethoxysilane, vinyltriethoxysilane, vinyltributoxysilane, and vinylmethyldimethoxysilane.

Examples of the monomer having two or more allyl groups include diallyl isophthalate, diallyl phthalate, and diallyl maleate.

Furthermore, the ethylenically unsaturated monomers used to obtain the resin fine particles (A) may also include, in addition to the ethylenic monomers (C), (F) and (G) described above, an ethylenically unsaturated monomer which is copolymerizable with the ethylenic monomers (C), (G) and (F).

Examples of the ethylenic monomer which is copolymerizable with the ethylenically unsaturated monomers (C), (F) and (G), include linear or branched alkyl group-containing ethylenically unsaturated monomers such as methyl(meth)acrylate, ethyl(meth)acrylate, propyl(meth)acrylate, n-butyl(meth)acrylate, t-butyl(meth)acrylate, pentyl(meth)acrylate, heptyl(meth)acrylate, hexyl(meth)acrylate, 2-ethylhexyl(meth)acrylate, octyl(meth)acrylate, nonyl(meth)acrylate, decyl(meth)acrylate, undecyl(meth)acrylate, dodecyl(meth)acrylate, tridecyl(meth)acrylate, and tetradecyl(meth)acrylate; alicyclic alkyl group-containing ethylenically unsaturated monomers such as cyclohexyl(meth)acrylate and isobornyl(meth)acrylate; and fluorinated alkyl group-containing ethylenically unsaturated monomers such as trifluoroethyl(meth)acrylate and heptadecafluorodecyl(meth)acrylate.

The ethylenically unsaturated monomer may be used alone, or in combination of plural kinds.

The ethylenically unsaturated monomer which is copolymerizable with the ethylenic monomers (C), (G) and (F) is preferably used at a proportion of 70% by weight or less in 100% by weight of the total amount of the ethylenically unsaturated monomers.

The resin fine particles (A) formed by emulsion polymerizing various ethylenically unsaturated monomers in the amount ranges described above, have highly excellent dispersion stability. Therefore, even if the particle size is made small and the resin fine particles are used at a high solids content, the aqueous dispersion exhibits low viscosity, and the resin fine particles form only a very small amount of aggregates that cause nozzle clogging. Furthermore, even in the glycol-based solvent (H) and the ethylene glycol ether-based solvent (I) that are used in the ink composition, the resin fine particles do not aggregate at the time of mixing, and have excellent stability over time. On the other hand, at the time of drying, the resin fine particles have very satisfactory film forming properties in an ink composition including these solvents, so that the printed materials exhibit excellent coating film durability.

The average particle size of the resin fine particles (A) is preferably 60 nm to 250 nm, and more preferably in the range of 60 nm to 120 nm. When the average particle size is 60 nm or greater, the storage stability of the resin fine particles (A) in the ink composition becomes very satisfactory. When the average particle size is 250 nm or less, ejectability of the ink composition is very excellent, the resin fine particles (A) do not cause defective film formation, and there is no adverse effect on the gloss or brightness of printed materials.

The average particle size described above is a value measured by a dynamic light scattering method by which an aqueous dilution of an aqueous dispersion of the resin fine particles is irradiated with laser light, and the Brownian motion of the particles is detected from the scattered light.

The glass transition temperature (Tg) of the resin fine particles (A) is preferably 40° C. to 120° C. When the glass transition temperature (Tg) is 40° C. or higher, the water resistance or solvent resistance of printed materials is sufficiently exhibited. When the glass transition temperature (Tg) is 120° C. or lower, the film forming properties of the resin fine particles (A) are satisfactory, and the scratch resistance, water resistance and solvent resistance of printed materials are excellent.

The glass transition temperature (Tg) described above is a value determined by using a DSC (differential scanning calorimeter).

At the time of preparing an ink, the resin fine particles (A) are to be used in the form of an aqueous dispersion; however, it is preferable that an aqueous dispersion of the resin fine particles (A) have a viscosity as measured under the conditions of 25° C. and a solid concentration (hereinafter, the solid concentration may be abbreviated to "NV") of 40% by weight, of 5 mPa·s to 200 mPa·s. An aqueous dispersion of resin fine particles having a viscosity of 5 mPa·s or greater can be easily prepared to have an average particle size in the range of 60 nm to 250 nm. When the viscosity is 200 mPa·s or less, the viscosity of the ink composition is not increased, and the ink composition has excellent ejectability and satisfactory printing suitability.

The "viscosity" as used herein is a value measured by using a double cylinder type viscometer (BL type viscometer) under the conditions of 25° C. and a solid concentration of the aqueous dispersion of 40% by weight.

The preparation of an aqueous dispersion of resin fine particles at a solids content of 40% by weight may be achieved by: introducing the raw materials such that the solid concentration at the time point when the polymerization reaction has been completed would be 40% by weight; diluting a product that has been synthesized at a high solids content, with water to 40% by weight; or concentrating a product that has been synthesized at a low solids content to 40% by weight through an operation such as stripping.

With regard to the resin fine particles (A), it is preferable that the amount of coarse particles having a particle size of 1 µm or greater in an aqueous dispersion liquid of the resin fine particles (A) at a solid concentration of 30 ppm be $4\times10^4$ particles/cm$^3$ or less.

When the amount of coarse particles having a particle size of 1 µm or greater in an aqueous dispersion liquid at a solid concentration of 30 ppm is $4\times10^4$ particles/cm$^3$ or less, satisfactory ejectability of the ink is obtained without causing any nozzle clogging at the head.

The amount of coarse particles described above is a value measured by a method of irradiating an aqueous dilution of an aqueous dispersion of the resin fine particles with laser light, and counting the number of the projected diameters of the particles. As for the measurement method, an Accusizer SIS/SW788 analyzer (manufactured by International Business Co., Ltd.) is used, and a dilution having a solid concentration of 30 ppm is obtained by diluting 15,000 times the resin fine particles (A) at a solid concentration of 40% obtained by synthesis. As this dilution is analyzed, the number of particles can be quantitatively measured.

The resin fine particles (A) are synthesized by a conventional emulsion polymerization method that has been already known.

As the emulsifier that is used at the time of emulsion polymerization, conventionally known emulsifiers such as a reactive emulsifier having an ethylenically unsaturated group and a non-reactive emulsifier which does not have an ethylenically unsaturated group, can be arbitrarily used.

The reactive emulsifier having an ethylenically unsaturated group may be further roughly classified, and examples thereof include nonionic emulsifiers of anionic systems and nonionic systems. Particularly, when an anionic reactive emulsifier having an ethylenically unsaturated group or a nonionic reactive emulsifier having an ethylenically unsaturated group is used, the dispersed particle size of the copolymer becomes fine, and at the same time, the particle size distribution becomes narrow. As a result, when the copolymer is used as a binder resin for aqueous inkjet ink, abrasion resistance or alcohol resistance can be enhanced, which is preferable. This anionic reactive emulsifier or nonionic reactive emulsifier having an ethylenically unsaturated group is such that one kind may be used alone, or plural kinds may be used as mixtures.

As an example of the anionic reactive emulsifier having an ethylenically unsaturated group, specific examples thereof will be listed below, but the invention is not intended to be limited to those described below only. Examples of the emulsifier described above include: alkyl ether systems (examples of commercially available products include AQUALON KH-05, KH-10 and KH-20 manufactured by Dai-ichi Kogyo Seiyaku Co., Ltd., ADEKA REASOAP SR-10N and SR-20N manufactured by Adeka Corp., and LATEMUL PD-104 manufactured by Kao Corp.);

sulfosuccinic acid ester systems (examples of commercially available products include LATEMUL S-120, S-120A, S-180P and S-180A manufactured by Kao Corp.; and ELEMINOL JS-2 manufactured by Sanyo Chemical Industries, Ltd.);

alkyl phenyl ether systems or alkyl phenyl ester systems (examples of commercially available products include AQUALON H-2855A, H-3855B, H-3855C, H-3856, HS-05, HS-10, HS-20 and HS-30 manufactured by Dai-ichi Kogyo Seiyaku co., Ltd., and ADEKA REASOAP SDX-222, SDX-223, SDX-232, SDX-233, SDX-259, SE-10N and SE-20N);

(meth)acrylate sulfuric acid ester systems (examples of commercially available products include ANTOX MS-60 and MS-2N manufactured by Nippon Nyukazai Co., Ltd., and ELEMINOL RS-30 manufactured by Sanyo Chemical Industries, Ltd.); and phosphoric acid ester systems (examples of commercially available products include H-3330PL manufactured by Dai-ichi Kogyo Seiyaku Co., Ltd.; and ADEKA REASOAP PP-70 manufactured by Adeka Corp.).

Examples of the nonionic reactive emulsifier include alkyl ether systems (examples of commercially available products include ADEKA REASOAP ER-10, ER-20, ER-30 and ER-40 manufactured by Adeka Corp.; and LATEMUL PD-420, PD-430 and PD-450 manufactured by Kao Corp.);

alkyl phenyl ether systems or alkyl phenyl ester systems (examples of commercially available products include AQUALON RN-10, RN-20, RN-30 and RN-50 manufactured by Dai-ichi Kogyo Seiyaku Co., Ltd.; and ADEKA REASOAP NE-10, NE-20, NE-30 and NE-40 manufactured by Adeka Corp.); and (meth)acrylate sulfuric acid ester systems (examples of commercially available products include RMA-564, RMA-568 and RNA-1114 manufactured by Nippon Nyukazai Co., Ltd.).

On the occasion of obtaining the resin fine particles (A) by emulsion polymerization, a non-reactive emulsifier which does not have an ethylenically unsaturated group can be used in combination as necessary, with the reactive emulsifier having an ethylenically unsaturated group as described above. The non-reactive emulsifier can be roughly classified into non-reactive anionic emulsifiers and non-reactive nonionic emulsifiers.

Examples of the non-reactive nonionic emulsifier include: polyoxyethylene alkyl ethers such as polyoxyethylene lauryl ether and polyoxyethylene stearyl ether;

polyoxyethylene alkyl phenyl ethers such as polyoxyethylene octyl phenyl ether and polyoxyethylene nonyl phenyl ether;

sorbitan higher fatty acid esters such as sorbitan monolaurate, sorbitan monostearate, and sorbitan trioleate;

polyoxyethylene sorbitan higher fatty acid esters such as polyoxyethylene sorbitan monolaurate;

polyoxyethylene higher fatty acid esters such as polyoxyethylene monolaurate and polyoxyethylene monostearate;

glycerin higher fatty acid esters such as oleic acid monoglyceride and stearic acid monoglyceride;

polyoxyethylene-polyoxypropylene block copolymers, and polyoxyethylene distyrenated phenyl ether.

Furthermore, examples of the non-reactive anionic emulsifier include: higher fatty acid salts such as sodium oleate;

alkylarylsulfonic acid salts such as sodium dodecylbenzenesulfonate;

alkyl sulfuric acid ester salts such as sodium lauryl sulfate; polyoxyethylene alkyl ether sulfuric acid ester salts such as sodium polyoxyethylene lauryl ether sulfate;

polyoxyethylene alkyl aryl ether sulfuric acid ester salts such as sodium polyoxyethylene nonyl phenyl ether sulfate;

alkylsulfosuccinic acid ester salts such as sodium monooctylsulfosuccinate, sodium dioctylsulfosuccinate, and sodium polyoxyethylene lauryl sulfosuccinate, and derivatives thereof; and polyoxyethylene distyrenated phenyl ether sulfuric acid ester salts.

The amount of the emulsifier used at the time of emulsion polymerization is preferably 0.5 parts to 2.0 parts by weight relative to 100 parts by weight of the total amount of the ethylenically unsaturated monomers. When the amount of the emulsifier is 0.5 parts by weight or greater, the resin fine particles (A) are stabilized at the time of emulsion polymerization, and the generation of aggregates that cause nozzle clogging occurs to a very small extent. On the other hand, when the amount of the emulsifier is 2.0 parts by weight or less, the amount of low molecular weight eluted components is small, and the coating film durability of printed materials is excellent.

The aqueous medium that is used upon the emulsion polymerization of an aqueous dispersion of the resin fine particles (A) may be water, and hydrophilic organic solvents can also be used to the extent that the purpose of the present invention is not impaired.

The polymerization initiator that is used to obtain an aqueous dispersion of the resin fine particles (A) is not particularly limited as long as it has an ability to initiate radical polymerization, and any known oil-soluble polymerization initiators or water-soluble polymerization initiators can be used. Preferably, a water-soluble polymerization initiator is used.

There are no particular limitations on the oil-soluble polymerization initiators, and examples thereof include:

organic peroxides such as benzoyl peroxide, tert-butyl peroxybenzoate, tert-butyl hydroperoxide, tert-butyl peroxy(2-ethylhexanoate), tert-butyl peroxy-3,5,5-trimethylhexanoate, and di-tert-butyl peroxide; and azobis compounds such as 2,2'-azobisisobutyronitrile, 2,2'-azobis-2,4-dimethylvaleronitrile, 2,2'-azobis(4-methoxy-2,4-dimethylvaleronitrile); and 1,1'-azobiscyclohexane-1-carbonitrile. These may be used singly or as mixtures of two or more kinds. These polymerization initiators are preferably used in the amount of 0.1 parts to 10.0 parts by weight relative to 100 parts by weight of the ethylenically unsaturated monomers.

Regarding the water-soluble polymerization initiators, for example, conventional compounds that are already known, such as ammonium persulfate, potassium persulfate, hydrogen peroxide, and 2,2'-azobis(2-methylpropionamidine)dihydrochloride, can be suitably used.

Furthermore, on the occasion of performing emulsion polymerization, a reducing agent can be used in combination with the polymerization initiator, if desired. Thereby, acceleration of the emulsion polymerization rate or implementation of emulsion polymerization at a low temperature may be facilitated. Examples of such a reducing agent include organic reducing compounds such as ascorbic acid, erythorbic acid, tartaric acid, citric acid, glucose, and metal salts such as formaldehyde sulfoxylate; inorganic reducing compounds such as sodium thiosulfate, sodium sulfite, sodium bisulfate, and sodium metabisulfite; ferrous chloride, Rongalite, and thiourea dioxide. These reducing agents are preferably used in the amount of 0.05 parts to 5.0 parts by weight relative to 100 parts by weight of the ethylenically unsaturated monomers. Meanwhile, even without using the polymerization initiators described above, polymerization can also be carried out by means of a photochemical reaction, irradiation of radiation, or the like. The polymerization temperature is set to a temperature higher than or equal to the polymerization initiation temperatures of the various polymerization initiators. For example, when a peroxide-based polymerization initiator is used, the polymerization temperature may be usually set to about 70° C. The polymerization time is not particularly limited, but is usually 2 to 24 hours.

Furthermore, if necessary, sodium acetate, sodium citrate, sodium bicarbonate and the like as buffering agents, and mercaptans such as octylmercaptan, 2-ethylhexyl thioglycolate, octyl thioglycolate, stearylmercaptan, laurylmercaptan, and t-dodecylmercaptan as chain transfer agents can be used in appropriate amounts.

The aqueous dispersion of the resin fine particles (A) obtained after the completion of emulsion polymerization can be neutralized with a basic compound. When neutralization is carried out, bases such as ammonia; alkylamines such as trimethylamine, triethylamine and butylamine;

alcoholamines such as 2-dimethylaminoethanol, 2-diethylaminoethanol, diethanolamine, triethanolamine, and aminomethylpropanol; and morpholine can be used for the neutralization.

A specific example of the aqueous inkjet ink composition is prepared by incorporating a pigment, a pigment-dispersing resin, resin fine particles (A), water, and hydrophilic solvents (B).

It is preferable that the aqueous inkjet ink composition contain an aqueous dispersion of the resin fine particles (A) described above in the amount of 1% to 20% by weight, and more preferably 2% to 15% by weight, in terms of solid content. When the amount of the aqueous dispersion of the resin fine particles (A) is 1% by weight or greater in terms of solid content, the binding between the object to be printed and pigment particles thereon, or the binding between the pigment particles is improved, and printed materials exhibit excellent scratch resistance or water resistance. On the other hand, when the amount of the aqueous dispersion of the resin fine particles (A) is 20% by weight or less in terms of solid content, satisfactory ejectability is obtained, without an increase in the viscosity of the ink composition.

The pigment-dispersing resin that is used at the time of dispersing the pigment is preferably a water-soluble resin having a carboxyl group, from the viewpoint of dispersion stabilization in an aqueous system. Examples thereof include acrylic resins, styrene-acrylic resins, polyester resins, polyamide resins, and polyurethane resins. Regarding these resins, commercially available products may be used. Examples of the commercially available products include JONCRYL 67, JONCRYL 678, JONCRYL 586, JONCRYL 611, JONCRYL 683, JONCRYL 690, JONCRYL 57J, JONCRYL 60J, JONCRYL 61J, JONCRYL 62J, JONCRYL 63J, JONCRYL HPD-96J, JONCRYL 501J and JONCRYL PDX-6102B manufactured by BASF SE; DISPERBYK, DISPERBYK 180, DISPERBYK 187, DISPERBYK 190, DISPERBYK 191, DISPERBYK 194, DISPERBYK 2010, DISPERBYK 2015, DISPERBYK 2090, DISPERBYK 2091, DISPERBYK 2095, and DISPERBYK 2155 manufactured by BYK Chemie K.K.; SOLSPERS 41000 manufactured by Zeneca, Inc.; and SMA 1000H, SMA 1440H, SMA 2000H, SMA 3000H, and SMA 17352H manufactured by Sartomer Co., Inc.

The pigment-dispersing resin is used in the range of preferably 0.5 parts to 20 parts by weight, and more preferably in the range of 1 part to 10 parts by weight, relative to 10 parts by weight of the pigment. When the amount of the pigment-dispersing resin is 0.5 parts by weight or greater relative to 10 parts by weight of the pigment, the dispersion stability of the pigment is satisfactory, and the stability over time of the ink composition is excellent. On the other hand, when the amount of the pigment-dispersing resin is 20 parts by weight or less relative to 10 parts by weight of the pigment, satisfactory ejectability is obtained without an increase in the viscosity of the ink composition.

Examples of the pigment that can be used include achromatic pigments such as carbon black, titanium oxide and calcium carbonate; or chromatic organic pigments. Examples of the organic pigments include insoluble azo pigments such as toluidine red, toluidine maroon, Hansa yellow, benzidine yellow, and pyrazolone red; soluble azo pigments such as lithol red, Helio Bordeaux, Pigment Scarlet, and Permanent Red 2B; derivatives from vat dyes such as alizarin, indanthrone, and thioindigo maroon; phthalocyanine-based organic pigments such as phthalocyanine blue and phthalocyanine green; quinacridone-based organic pigments such as quinacridone red and quinacridone magenta; perylene-based organic pigments such as perylene red and perylene scarlet; isoindolinone-based organic pigments such as isoindolinone yellow and isoindolinone orange; pyranthrone-based organic pigments such as pyranthrone red and pyranthrone orange; thioindigo-based organic pigments, condensed azo-based organic pigments, benzimidazolone-based organic pigments; quinophthalone-based organic pigments such as quinophthalone yellow; isoindoline-based organic pigments such as isoindoline yellow; and other pigments such as flavanthrone yellow, acylamide yellow, nickel azo yellow, copper azomethine yellow, perinone orange, anthrone orange, dianthraquinonyl red, and dioxazine violet.

Examples of the organic pigments expressed in their color index (C.I.) numbers include C.I. Pigment Yellow 12, 13, 14, 17, 20, 24, 74, 83, 86, 93, 109, 110, 117, 120, 125, 128, 129, 137, 138, 139, 147, 148, 150, 151, 153, 154, 155, 166, 168, 180, and 185; C.I. Pigment Orange 16, 36, 43, 51, 55, 59, and 61; C.I. Pigment Red 9, 48, 49, 52, 53, 57, 97, 122, 123, 149, 168, 177, 180, 192, 202, 206, 215, 216, 217, 220, 223, 224, 226, 227, 228, 238, and 240; C.I. Pigment Violet 19, 23, 29, 30, 37, 40, and 50; C.I. Pigment Blue 15, 15:1, 15:3, 15:4, 15:6, 22, 60, and 64, C.I. Pigment Green 7 and 36; and C.I. Pigment Brown 23, 25, and 26.

Specific examples of carbon black include "Special Black 350, 250, 100, 550, 5, 4, 4A, 6," "Printex U, V, 140U, 140V, 95, 90, 85, 80, 75, 55, 45, 40, P, 60, L6, L, 300, 30, 3, 35, 25, A, G" manufactured by Degussa AG; "REGAL 400R, 660R, 330R, 250R," "MOGUL E, L" manufactured by Cabot Corp.; "MA 7, 8, 11, 77, 100, 100R, 100S, 220, 230," "#2700, #2650, #2600, #200, #2350, #2300, #2200, #1000, #990, #980, #970, #960, #950, #900, #850, #750, #650, #52, #50, #47, #45, #45L, #44, #40, #33, #332, #30, #25, #20, #10, #5, CF9, #95, and #260" manufactured by Mitsubishi Chemical Corp.

Specific examples of titanium oxide include "TIPAQUE CR-50, 50-2, 57, 80, 90, 93, 95, 953, 97, 60, 60-2, 63, 67, 58, 58-2, 85," "TIPAQUE R-820, 830, 930, 550, 630, 680, 670, 580, 780, 780-2, 850, 855," "TIPAQUE A-100, 220," "TIPAQUE W-10," "TIPAQUE PF-740, 744," "TTO-55(A), 55(B), 55 (C), 55(D), 55(S), 55(N), 51(A), 51(C)," "TTO-S-1, 2," "TTO-M-1, 2" manufactured by Ishihara Sangyo Kaisha, Ltd.; "TITANIX JR-301, 403, 405, 600A, 605, 600E, 603, 805, 806, 701, 800, 808," "TITANIX JA-1, C, 3, 4, 5" manufactured by Tayca Corp.; and "TI-PURE R-900, 902, 960, 706, 931" manufactured by DuPont Co. The organic pigments such as yellow, magenta, cyan and black pigments are used in the amount of usually 0.2% to 15% by weight, and preferably 0.5% to 10% by weight, relative to 100% by weight of the aqueous inkjet ink. Furthermore, in the case of white titanium oxide, it is preferable to incorporate the pigment at a proportion of usually 5% to 50% by weight, and preferably 10% to 45% by weight.

The hydrophilic solvents (B) include a glycol-based solvent (H) and an ethylene glycol ether solvent (I).

Examples of the glycol-based solvent (H) include ethylene glycol, 1,3-propanediol, propylene glycol, 1,2-butanediol, 1,4-butanediol, pentylene glycol, 1,2-hexanediol, 1,6-hexanediol, diethylene glycol, triethylene glycol, and tetraethylene glycol. These may be used singly, or plural kinds may be used as mixtures.

Examples of the ethylene glycol ether-based solvent (I) include methyl glycol, methyl diglycol, methyl triglycol, isopropyl diglycol, butyl glycol, butyl diglycol, butyl triglycol, isobutyl glycol, isobutyl diglycol, hexyl glycol, hexyl diglycol, ethylene glycol dimethyl ether, diethylene glycol dimethyl ether, triethylene glycol dimethyl ether, and tetraethyelne glycol dimethyl ether. These may be used singly, or plural kinds may be used as mixtures.

The hydrophilic solvents (B) may also include other hydrophilic solvents in addition to those described above. Examples of the other hydrophilic solvents include: glycol ether-based solvents such as methyl propylene glycol, methyl propylene diglycol, methyl propylene triglycol, propyl propylene glycol, and propyl propylene diglycol;

lactam-based solvents such as N-methyl-2-pyrrolidone, N-hydroxyethyl-2-pyrrolidone, 2-pyrrolidone, and ε-caprolactam; and amide-based solvents such as formamide, N-methylformamide, N,N-dimethylformamide, EQUAMIDE M-100 and EQUAMIDE B-100 manufactured by Idemitsu Kosan Co., Ltd.

These solvents are added to the ink composition as humectants components and penetration enhancer components. The glycol-based solvent (H) has a function of improving the drying properties of the resin fine particles (A), in addition to the function of decreasing the surface tension of the ink. By using the glycol-based solvent (H), drying of the resin fine particles (A) is prevented, and nozzle clogging of the ink composition is prevented. Furthermore, printing suitability is also improved.

Furthermore, the ethylene glycol ether solvent (I) has a function of decreasing the surface tension of the ink itself and thereby improving the wet spreading of ink droplets on hardly absorptive substrates, as well as a function of accelerating film formation of the resin fine particles (A) at the time of drying. By using the ethylene glycol ether solvent (I), the film forming properties of the resin fine particles (A) become very excellent, and the coating film durability of printed materials is improved. Furthermore, since the wet spreading of the ink is also prevented, printing suitability is enhanced to a large extent. When these hydrophilic solvents are added, the wet spreading of ink droplets on hardly absorptive substrates is improved, the dispersion stability of the resin fine particles is retained, and the film forming properties are sufficiently exhibited at the time of drying. Furthermore, the resin fine particles (A) are not subjected to the infiltration of these hydrophilic solvents and a consequent decrease in the dispersion stability. Accordingly, the storage stability and ejectability of the ink composition are very excellent. On the other hand, at the time of drying, since the film forming properties of the resin fine particles (A) are sufficiently promoted, printed materials exhibit satisfactory coating film durability.

It is preferable that the aqueous inkjet ink composition contain the glycol-based solvent (H) in the amount of 10% to 40% by weight, and more preferably 10% to 35% by weight, relative to 100% by weight of the aqueous inkjet ink composition. When the content of the glycol-based solvent (H) is 10% by weight or greater, the resin fine particles (A) do not easily dry up in the ink composition, nozzle clogging does not occur, and excellent printing suitability is obtained. On the other hand, when the content of the glycol-based solvent (H) is 40% by weight or less, the drying properties of printed materials are satisfactory, and excellent coating film durability or printing suitability is obtained.

Furthermore, it is preferable that the aqueous inkjet ink composition contain the ethylene glycol ether solvent (I) in the range of 0.1% to 15% by weight, and more preferably in the range of 0.1% to 5% by weight, relative to 100% by weight of the aqueous inkjet ink composition. When the content of the ethylene glycol ether-based solvent (I) is 0.1% by weight or greater, satisfactory printing suitability is obtained, the film forming properties of the resin fine particles (A) are excellent, and the printed materials have excellent adhesiveness, scratch resistance, water resistance, and solvent resistance. On the other hand, when the content of the ethylene glycol ether-based solvent (I) is 15% by weight or less, the dispersion stability of the resin fine particles (A) in the ink composition is satisfactory, and the ink has satisfactory storage stability, ejectability, and printing suitability.

The hydrophilic solvents (B) as a whole are used in the amount of usually 10% to 60% by weight, and preferably 20% to 50% by weight, relative to 100% by weight of the aqueous inkjet ink composition. When the content of the hydrophilic solvents (B) is 10% by weight or greater, drying of the ink composition at the nozzles does not occur, and excellent ejectability is obtained. On the other hand, when the content of the hydrophilic solvent (B) is 60% by weight or less, the printed materials have excellent drying properties, and the coating film durability such as adhesiveness, scratch resistance, water resistance and solvent resistance is satisfactory.

There are no particular limitations on the method for preparing the aqueous inkjet ink composition. For example, first, an aqueous dispersion of resin fine particles (A) including the resin fine particles (A) is prepared by a method such as described above. Furthermore, a pigment, a pigment-dispersing resin, and water are thoroughly mixed together, and thus a pigment dispersion liquid is prepared. Subsequently, the aqueous dispersion of resin fine particles (A) and the pigment dispersion liquid thus obtained are thoroughly mixed with water and hydrophilic solvents (B), and thereby, an aqueous inkjet ink composition can be prepared. For the mixing operation, a dispersing machine, for example, a paint conditioner can be used.

Examples of substrates on which an aqueous inkjet ink composition can be suitably applied include penetrable substrates such as high quality paper; and non-penetrable substrates such as art paper, coated paper, and polyvinyl chloride sheets.

An example of an inkjet printing system which uses an aqueous inkjet ink composition may be an inkjet system having an on-demand type recording head. Examples of the on-demand type include a piezo system, a thermal inkjet system, and an electrostatic system, and a piezo system is most preferred.

Furthermore, on the occasion of printing using an aqueous inkjet ink composition, a heating and drying process can be introduced into the printing process if necessary, for the purpose of reinforcing the drying properties and durability of printed materials. By introducing a heating and drying process, the film forming properties of the binder resin composition may also be enhanced. Therefore, an appropriate heating treatment is preferable. The heating treatment process can be used to an extent that the printing process (inkjet printing speed) is not affected, and for example, it is general to carry out the treatment at a temperature of 40° C. to 100° C. for 1 second to 200 seconds.

EXAMPLES

Hereinafter, the present invention will be more specifically described by way of Examples, but the following Examples are not intended to limit the scope of rights of the present invention by any means. Meanwhile, the unit "parts" in the Examples represents "parts by weight", and "percent (%)" represents "percent (%) by weight".

Synthesis Example 1

In a reaction vessel equipped with a stirrer, a thermometer, a dropping funnel, and a reflux condenser, 55 parts of ion-exchanged water and 0.4 parts of AQUALON KH-10 (manufactured by Dai-ichi Kogyo Seiyaku Co., Ltd.) as an emulsifier were introduced.

Separately, 24 parts of 2-ethylhexyl acrylate, 34 parts of methyl methacrylate, 34 parts of styrene, 1.0 part of sodium styrenesulfonate, 1.0 part of acrylamide, 6.0 parts of vinyltriethoxysilane, 30 parts of ion-exchanged water, and 0.6 parts of AQUALON KH-10 as an emulsifier were mixed with stirring by a homomixer, then, an emulsion was obtained. 5 parts of the emulsion were isolated and added to the reaction vessel described above.

Next, the internal temperature was raised to 70° C., and the reaction vessel was sufficiently purged with nitrogen. Subsequently, 4.0 parts of a 5% aqueous solution of potassium persulfate and 5.0 parts of a 1% aqueous solution of anhydrous sodium bisulfate were added to the reaction vessel, and thereby, polymerization was initiated. After the initiation of the reaction, while the internal temperature was maintained at 75° C., the remainder of the emulsion described above, 1.5 parts of a 5% aqueous solution of potassium persulfate, and 5.8 parts of a 1% aqueous solution of anhydrous sodium bisulfate were added dropwise to the reaction vessel over 1.5 hours, and stirring was continued for another 2 hours. After completion of the reaction, the temperature was lowered to 30° C., dimethylaminoethanol was added to the system to adjust the pH to 8.9. Furthermore, the solids content was adjusted to 40% with ion-exchanged water, and thus an aqueous dispersion of resin fine particles (A) was obtained. The average particle size of the resin fine particles (A) thus obtained was 78 nm, the glass transition temperature was 45° C., and the viscosity of the aqueous dispersion of the resin fine particles (A) was 42 mPa·s.

Synthesis Examples 2 to 34

Synthesis was carried out in the same manner as in Synthesis Example 1, by using the mixing compositions indicated in Table 1 and Table 2, and thus aqueous dispersions of resin fine particles (A) were obtained. Meanwhile, emulsion polymerization was carried out by changing the amount of the emulsifier AQUALON KH-10 to be introduced into the reaction vessel, to 1.0 part in Synthesis Example 14; to 0.1 parts in Synthesis Example 16; and to 0.2 parts in Synthesis Example 18. Evaluations were carried out on the presence or absence of aggregates, the amount of coarse particles, glass transition temperature (Tg), average particle size, and viscosity, as the basic properties of the aqueous dispersions of resin fine particles (A) thus obtained.

[Presence or Absence of Aggregates]

Each of the aqueous dispersions of resin fine particles (A) was filtered through a 180-mesh (100 μm) cloth, and the amount of aggregates per kilogram (kg) of the aqueous dispersion of resin fine particles (A) generated during the synthesis was measured. The evaluation criteria are as follows.

◯: Less than 0.1 g

Δ: Equal to or greater than 0.1 g and less than 0.3 g

X: Equal to or greater than 0.3 g

[Amount of Coarse Particles]

The aqueous dispersion of resin fine particles (A) was diluted 15,000 times with water, and about 20 ml of the dilution was analyzed by using a particle size analyzer of particle number counting type (Accusizer SIS/SW788 analyzer, manufactured by International Business Co., Ltd.). Based on the number average particle size distribution data (histogram) obtained at this time, the amount of coarse particles having a particle size of 1 μm or greater was calculated.

[Glass Transition Temperature (Tg)]

The glass transition temperature (Tg) was measured with a DSC (differential scanning calorimeter, manufactured by TA Instruments, Inc.). About 2 mg of a sample obtained by thoroughly drying the aqueous dispersion of resin fine particles (A) was weighed on an aluminum pan, and the aluminum pan was mounted on a DSC measurement holder. The endotherm peaks in the chart obtained under the conditions of a temperature increase rate of 5° C./rain were read, and thus the glass transition temperature (Tg) was obtained.

[Average Particle Size]

The aqueous dispersion of resin fine particles (A) was diluted 500 times with water, and measurement was made by a dynamic light scattering analysis method (the analyzer was a MICROTRACK manufactured by Nikkiso Co., Ltd.) by using about 5 ml of the dilution. At this time, the peak of the volume particle size distribution data (histogram) thus obtained was designated as the average particle size.

[Viscosity]

The viscosity of the aqueous dispersion of resin fine particles (A) was measured with a double cylinder type viscometer (BL type viscometer, manufactured by TOKIMEC, Inc.) under the conditions of a temperature of 25° C., rotor No. 1, a speed of rotation of 30 rpm, and a solid concentration of the aqueous dispersion of resin fine particles of 40% by weight.

TABLE 1

|  |  | Synthesis Example 1 | Synthesis Example 2 | Synthesis Example 3 | Synthesis Example 4 | Synthesis Example 5 | Synthesis Example 6 |
|---|---|---|---|---|---|---|---|
| Monomer (C) | Styrene | 34.0 | 20.0 | 47.5 |  |  | 12.0 |
|  | Benzyl methacrylate |  |  |  | 42.6 |  | 5.0 |
|  | Phenoxyethyl acrylate |  |  | 10.0 |  |  |  |
|  | α-methylstyrene |  |  |  |  |  |  |
|  | Vinylnaphthalene |  |  |  |  | 64.9 | 5.0 |
| Monomer (D) | Sodium styrenesulfonate | 1.0 |  |  |  | 1.9 |  |
|  | Ammonium styrenesulfonate |  | 0.5 |  |  |  | 1.0 |
|  | 2-Acrylamido-2-methylpropanesulfonic acid |  |  | 2.0 |  |  |  |
|  | Sodium allylsulfonate |  |  |  | 1.5 |  |  |
| Monomer (E) | Acrylamide | 1.0 |  |  |  |  | 1.0 |
|  | PE-350 (manufactured by NOF Corp.) |  | 0.2 |  | 3.0 |  |  |
|  | PME-1000 (manufactured by NOF Corp.) |  |  | 2.0 |  |  |  |
|  | 2-Hydroxyethyl methacrylate |  |  |  |  | 0.6 |  |
| Monomer (G) | Vinyltriethoxysilane | 6.0 |  |  | 6.0 |  |  |
|  | γ-methacryloxypropyltrimethoxysilane |  |  | 0.4 | 1.0 | 0.5 |  |
|  | γ-methacryloxypropyltriethoxysilane |  |  |  |  |  |  |
|  | Diallyl phthalate |  | 9.5 |  |  |  |  |
|  | N-methylolacrylamide |  |  |  |  |  |  |
|  | Ethylene glycol dimethacrylate |  |  |  |  |  | 2.0 |
|  | 1,9-Nonanediol di(meth)acrylate |  |  |  |  |  |  |
| Other monomers | Methyl methacrylate | 34.0 | 60.5 | 20.0 | 30.9 | 3.0 | 66.7 |
|  | Butyl acrylate |  | 9.3 | 18.1 |  |  |  |
|  | 2-Ethylhexyl acrylate | 24.0 |  |  |  |  |  |
|  | t-butyl methacrylate |  |  |  |  |  |  |
|  | Cyclohexyl methacrylate |  |  |  |  |  | 7.3 |
|  | Trifluoroethyl methacrylate |  |  |  | 15.0 | 29.1 |  |
|  | Acrylic acid |  |  |  |  |  |  |
|  | Methacrylic acid |  |  |  |  |  |  |
| Properties of aqueous dispersion of resin fine particles (A) | Presence or absence of aggregates | ◯ | ◯ | ◯ | ◯ | ◯ | ◯ |
|  | Amount of coarse particles [particles/cm$^3$] | 12134 | 13027 | 29032 | 35805 | 11029 | 12876 |
|  | Glass transition temperature (Tg) [° C.] | 45 | 80 | 42 | 75 | 110 | 100 |
|  | Average particle size [nm] | 78 | 86 | 92 | 96 | 100 | 65 |
|  | Viscosity (NV40%) [mPa·s] | 42.0 | 28.4 | 19.2 | 15.3 | 13.7 | 98.8 |

|  | Monomer | Synthesis Example 7 | Synthesis Example 8 | Synthesis Example 9 | Synthesis Example 10 | Synthesis Example 11 | Synthesis Example 12 |
|---|---|---|---|---|---|---|---|
|  | Styrene |  |  |  |  |  |  |
| (C) | Benzyl methacrylate | 10.0 | 30.0 | 30.0 | 55.0 | 34.0 | 75.0 |
|  | Phenoxyethyl acrylate |  |  | 12.3 |  |  |  |
|  | α-methylstyrene |  |  |  |  |  |  |
|  | Vinylnaphthalene | 10.0 | 5.0 |  |  |  |  |
| Monomer (D) | Sodium styrenesulfonate | 20.0 |  | 10.0 |  |  |  |
|  | Ammonium styrenesulfonate | 0.8 | 0.7 |  | 1.8 | 1.0 |  |
|  | 2-Acrylamido-2-methylpropanesulfonic acid |  |  | 1.2 |  |  | 1.0 |
|  | Sodium allylsulfonate |  |  |  |  |  |  |
| Monomer (E) | Acrylamide |  |  |  |  |  |  |
|  | PE-350 (manufactured by NOF Corp.) |  |  |  |  | 1.0 | 1.0 |
|  | PME-1000 (manufactured by NOF Corp.) | 1.5 |  | 2.4 |  |  |  |
|  | 2-Hydroxyethyl methacrylate |  |  |  |  |  |  |
| Monomer (G) | Vinyltriethoxysilane | 0.5 | 1.0 |  | 0.2 |  | 1.0 |
|  | γ-methacryloxypropyltrimethoxysilane | 5.5 |  |  |  | 6.0 |  |
|  | γ-methacryloxypropyltriethoxysilane |  |  |  |  |  |  |
|  | Diallyl phthalate |  |  |  |  |  | 0.3 |
|  | N-methylolacrylamide | 1.5 |  | 1.0 |  |  |  |
|  | Ethylene glycol dimethacrylate |  |  |  | 1.5 |  |  |
|  | 1,9-Nonanediol di(meth)acrylate |  |  |  |  |  |  |
| Other monomers | Methyl methacrylate |  | 0.8 |  |  |  |  |
|  | Butyl acrylate |  | 45.4 | 43.1 | 31.1 | 30.1 | 2.0 |
|  | 2-Ethylhexyl acrylate |  |  |  | 10.4 |  | 10.0 |
|  | t-butyl methacrylate | 20.3 | 17.1 |  |  | 27.9 | 9.7 |
|  | Cyclohexyl methacrylate | 29.9 |  |  |  |  |  |
|  | Trifluoroethyl methacrylate |  |  |  |  |  |  |
|  | Acrylic acid |  |  |  |  |  |  |
|  | Methacrylic acid |  |  |  |  |  |  |
| Properties of aqueous dispersion of resin | Presence or absence of aggregates | ◯ | ◯ | ◯ | ◯ | ◯ | ◯ |
|  | Amount of coarse particles [particles/cm$^3$] | 11347 | 13008 | 10986 | 12390 | 12035 | 14122 |
|  | Glass transition temperature (Tg) [° C.] |  |  |  |  |  |  |
|  | Average particle size [nm] | 65 | 64 | 90 | 80 | 35 | 55 |

TABLE 1-continued

| | | | | | | | |
|---|---|---|---|---|---|---|---|
| fine particles (A) | Viscosity (NV40%) [mPa · s] | 64 120.3 | 87 27.5 | 73 50.5 | 81 36.8 | 82 40.0 | 102 14.2 |

| | | Synthesis Example 13 | Synthesis Example 14 | Synthesis Example 15 | Synthesis Example 16 | Synthesis Example 17 | Synthesis Example 18 |
|---|---|---|---|---|---|---|---|
| Monomer (C) | Styrene | | 30.0 | 45.0 | 30.0 | 40.0 | 30.0 |
| | Benzyl methacrylate | | | | | | |
| | Phenoxyethyl acrylate | | | 5.0 | | | |
| | α-methylstyrene | 5.0 | | | | 10.0 | |
| | Vinylnaphthalene | 59.2 | | | | | |
| Monomer (D) | Sodium styrenesulfonate | 1.0 | 1.0 | 2.0 | 1.0 | 0.6 | |
| | Ammonium styrenesulfonate | | | | | | |
| | 2-Acrylamido-2-methylpropanesulfonic acid | | | | | | 1.0 |
| | Sodium allylsulfonate | | | 1.0 | | | |
| Monomer (E) | Acrylamide | 1.0 | 1.0 | | 1.0 | 3.0 | 1.0 |
| | PE-350 (manufactured by NOF Corp.) | | | | | | |
| | PME-1000 (manufactured by NOF Corp.) | | | 3.0 | | | |
| | 2-Hydroxyethyl methacrylate | | | | | | |
| Monomer (G) | Vinyltriethoxysilane | 6.0 | 6.0 | | 6.0 | | |
| | γ-methacryloxypropyltrimethoxysilane | | | 3.0 | | | |
| | γ-methacryloxypropyltriethoxysilane | | | | | | |
| | Diallyl phthalate | | | | | 0.3 | |
| | N-methylolacrylamide | | | | | | 6.0 |
| | Ethylene glycol dimethacrylate | | | | | | |
| | 1,9-Nonanediol di(meth)acrylate | | | | | | |
| Other monomers | Methyl methacrylate | 27.8 | 45.6 | | 45.6 | 24.2 | 45.6 |
| | Butyl acrylate | | | | | 21.9 | |
| | 2-Ethylhexyl acrylate | | 16.4 | | 16.4 | | 16.4 |
| | t-butyl methacrylate | | | | | | |
| | Cyclohexyl methacrylate | | | 41 | | | |
| | Trifluoroethyl methacrylate | | | | | | |
| | Acrylic acid | | | | | | |
| | Methacrylic acid | | | | | | |
| Properties of aqueous dispersion of resin fine particles (A) | Presence or absence of aggregates | ○ | ○ | ○ | ○ | ○ | ○ |
| | Amount of coarse particles [particles/cm³] | 12897 | 11543 | 10995 | 25367 | 14302 | 40511 |
| | Glass transition temperature (Tg) [° C.] | 124 | 60 | 85 | 60 | 60 | 60 |
| | Average particle size [nm] | 75 | 58 | 67 | 256 | 78 | 165 |
| | Viscosity (NV40%) [mPa · s] | 30.1 | 198.0 | 100.3 | 8.9 | 211.0 | 8.9 |

PE-350: Polyethylene glycol monomethacrylate (mole number of added EO: 8)
PME-1000: Methoxypolyethylene glycol monomethacrylate (mole number of added EO: 23)

TABLE 2

| | | Synthesis Example 19 | Synthesis Example 20 | Synthesis Example 21 | Synthesis Example 22 | Synthesis Example 23 | Synthesis Example 24 | Synthesis Example 25 | Synthesis Example 26 |
|---|---|---|---|---|---|---|---|---|---|
| Monomer (C) | Styrene | | | 34.0 | 34.0 | 50.0 | 25.0 | | 40.0 |
| | Benzyl methacrylate | | | | | | | 30.3 | |
| | Phenoxyethyl acrylate | | | | | | | | 5.3 |
| | α-methylstyrene | | | | | | 5.0 | | |
| | Vinylnaphthalene | | | | | | | 15.0 | |
| Monomer (D) | Sodium styrenesulfonate | 1.0 | | | | | | | |
| | Ammonium styrenesulfonate | | | | | | 1.5 | | 1.5 |
| | 2-Acrylamido-2-methylpropanesulfonic acid | | 2.0 | | | | | 2.0 | |
| | Sodium allylsulfonate | | | | | | | | |
| Monomer (E) | Acrylamide | 1.0 | 1.0 | 1.0 | 1.0 | | | | |
| | PE-350 (manufactured by NOF Corp.) | | | | | | | | |
| | PME-1000 (manufactured by NOF Corp.) | | | | | 3.0 | | | |
| | 2-Hydroxyethyl methacrylate | | | | | | | | 1.5 |
| Monomer (G) | Vinyltriethoxysilane | 6.0 | | 6.0 | 6.0 | | | | |
| | γ-methacryloxypropyltrimethoxysilane | | | | | | 1.4 | | |
| | γ-methacryloxypropyltriethoxysilane | | | | | | | | |
| | Diallyl phthalate | | 2.0 | | | 2.0 | | 1.5 | |
| | N-methylolacrylamide | | | | | | | | |
| | Ethylene glycol dimethacrylate | | | | | | | | |
| | 1,9-Nonanediol di(meth)acrylate | | | | | | | | |

TABLE 2-continued

| | | | | | | | | | |
|---|---|---|---|---|---|---|---|---|---|
| Other monomers | Methyl methacrylate | 68.0 | 67.2 | 35.7 | 34.0 | 30.8 | 31.9 | 30.0 | 51.7 |
| | Butyl acrylate | | 17.8 | | | | 15.2 | 19.2 | |
| | 2-Ethylhexyl acrylate | 24.0 | | 23.3 | 24.0 | 9.2 | | | |
| | t-butyl methacrylate | | | | | | 10.0 | | |
| | Cyclohexyl methacrylate | | 10.0 | | | | | | |
| | Trifluoroethyl methacrylate | | | | | | 10.0 | | |
| | Acrylic acid | | | | 1.0 | | | 2.0 | |
| | Methacrylic acid | | | | | 5.0 | | | |
| Properties of aqueous dispersion of resin fine particles (A) | Presence or absence of aggregates | Δ | Δ | X | X | Δ | ○ | ○ | ○ |
| | Amount of coarse particles [particles/cm³] | 50823 | 51032 | 123448 | 102498 | 80921 | 18909 | 17865 | 14027 |
| | Glass transition temperature (Tg) [° C.] | 45 | 60 | 45 | 45 | 80 | 70 | 54 | 95 |
| | Average particle size [nm] | 130 | 134 | 118 | 132 | 125 | 85 | 75 | 82 |
| | Viscosity (NV40%) [mPa·s] | 12.3 | 13.0 | 16.8 | 17.4 | 23.4 | 35.1 | 55.7 | 40.1 |

| | | Synthesis Example 27 | Synthesis Example 28 | Synthesis Example 29 | Synthesis Example 30 | Synthesis Example 31 | Synthesis Example 32 | Synthesis Example 33 | Synthesis Example 34 |
|---|---|---|---|---|---|---|---|---|---|
| Monomer (C) | Styrene | 34.0 | 5.0 | 20.0 | 34.0 | 34.0 | 34.0 | 34.0 | 34.0 |
| | Benzyl methacrylate | | | | | | | | |
| | Phenoxyethyl acrylate | | | | | | | | |
| | α-methylstyrene | | | 5.0 | | | | | |
| | Vinylnaphthalene | | | 58.7 | | | | | |
| Monomer (D) | Sodium styrenesulfonate | 1.0 | | 2.0 | 0.3 | 3.1 | 1.0 | 1.0 | |
| | Ammonium styrenesulfonate | | | | | | | | 1.5 |
| | 2-Acrylamido-2-methylpropanesulfonic acid | | | | | | | | |
| | Sodium allylsulfonate | | 2.0 | | | | | | |
| Monomer (E) | Acrylamide | 1.0 | 2.5 | | 1.0 | 1.0 | 4.0 | 1.0 | 0.5 |
| | PE-350 (manufactured by NOF Corp.) | | | | | | | | |
| | PME-1000 (manufactured by NOF Corp.) | | | | | | | | |
| | 2-Hydroxyethyl methacrylate | | | 0.5 | | | | | |
| Monomer (G) | Vinyltriethoxysilane | | | | 6.0 | 6.0 | 6.0 | 10.5 | |
| | γ-methacryloxypropyltrimethoxysilane | | | 0.5 | | | | | |
| | γ-methacryloxypropyltriethoxysilane | | | | | | | | |
| | Diallyl phthalate | | | | | | | | 10.5 |
| | N-methylolacrylamide | | | | | | | | |
| | Ethylene glycol dimethacrylate | | | | | | | | |
| | 1,9-Nonanediol di(meth)acrylate | | | | | | | | |
| Other monomers | Methyl methacrylate | 39.4 | 65.9 | | 35.5 | 33.5 | 32.7 | 31.6 | 31.6 |
| | Butyl acrylate | | 24.6 | 3.3 | | | | | |
| | 2-Ethylhexyl acrylate | 24.6 | | | 23.2 | 22.5 | 22.3 | 21.9 | 21.9 |
| | t-butyl methacrylate | | | | | | | | |
| | Cyclohexyl methacrylate | | | | | | | | |
| | Trifluoroethyl methacrylate | | | 10.0 | | | | | |
| | Acrylic acid | | | | | | | | |
| | Methacrylic acid | | | | | | | | |
| Properties of aqueous dispersion of resin fine particles (A) | Presence or absence of aggregates | ○ | ○ | Δ | Δ | X | ○ | X | X |
| | Amount of coarse particles [particles/cm³] | 13027 | 11238 | 42087 | 42587 | 59837 | 13425 | 55823 | 60032 |
| | Glass transition temperature (Tg) [° C.] | 45 | 50 | 110 | 45 | 45 | 45 | 45 | 45 |
| | Average particle size [nm] | 79.2 | 145 | 74 | 103 | 66 | 89 | 80 | 80 |
| | Viscosity (NV40%) [mPa·s] | 70.5 | 168.3 | 12.1 | 11.0 | 170.3 | 302 | 38.3 | 34.7 |

PE-350: Polyethylene glycol monomethacrylate (mole number of added EO: 8)
PME-1000: Methoxypolyethylene glycol monomethacrylate (mole number of added EO: 23)

<Preparation of Concentrated Pigment Dispersion Liquid>

[Preparation of Cyan Pigment Dispersion Liquid]

20 parts of a pigment [Lionogen Blue 7351, manufactured by Toyo Ink SC Holdings Co., Ltd.], 30 parts of a pigment-dispersing resin [JONCRYL 61J, manufactured by BASF SE, aqueous solution having a solids content of 30%], 29.3 parts of ion-exchanged water, and 0.5 parts of a defoamant [SURFINOL 104E, manufactured by Nissin Chemical Industry Co., Ltd.] were dispersed in a paint conditioner for 2 hours, and thus a concentrated cyan pigment dispersion liquid was obtained.

[Preparation of Magenta Pigment Dispersion Liquid]

A concentrated magenta pigment dispersion liquid was obtained in the same manner as in the case of the cyan pigment dispersion liquid, except that the pigment was changed to 20 parts of Fastogen Super Magenta RGT manufactured by DIC Corp.

[Preparation of Yellow Pigment Dispersion Liquid]

A concentrated yellow pigment dispersion liquid was obtained in the same manner as in the case of the cyan pigment dispersion liquid, except that the pigment was changed to 20 parts of Novoperm Yellow H2G manufactured by Clariant Corp.

[Preparation of Black Pigment Dispersion Liquid]

A concentrated black pigment dispersion liquid was obtained in the same manner as in the case of the cyan pigment dispersion liquid, except that the pigment was changed to 20 parts of Printex 85 manufactured by Evonik Degussa GmbH.

Example 1

To 12.5 parts of the aqueous dispersion of resin fine particles obtained in Synthesis Example 1, 20.0 parts of the cyan pigment dispersion liquid described above, 28.0 parts of propylene glycol and 2.0 parts of hexyl diglycol as hydrophilic solvents, and 37.5 parts of ion-exchanged water were added, and then the mixture was kneaded to obtain an aqueous inkjet ink composition. The same preparation process was carried out for the magenta pigment dispersion liquid, the yellow pigment dispersion liquid and the black pigment dispersion liquid, respectively. Thus, aqueous inkjet ink compositions of four colors were obtained.

Examples 2 to 30 and Comparative Examples 1 to 22

Ink compositions were prepared in the same manner as in Example 1 by using the mixing compositions indicated in Table 3 and Table 4, and thus aqueous inkjet ink compositions were obtained.

TABLE 3

| Ink composition | | Example 1 | Example 2 | Example 3 | Example 4 | Example 5 | Example 6 | Example 7 | Example 8 | Example 9 |
|---|---|---|---|---|---|---|---|---|---|---|
| Resin fine particles used | | Synthesis Example 1 | Synthesis Example 2 | Synthesis Example 3 | Synthesis Example 4 | Synthesis Example 5 | Synthesis Example 6 | Synthesis Example 7 | Synthesis Example 8 | Synthesis Example 9 |
| Aqueous dispersion of resin fine particles | | 12.5 | 12.5 | 12.5 | 12.5 | 12.5 | 12.5 | 12.5 | 12.5 | 12.5 |
| Pigment dispersion liquid | | 20 | 20 | 20 | 20 | 20 | 20 | 20 | 20 | 20 |
| Purified water | | 37.5 | 37.5 | 37.5 | 37.5 | 37.5 | 37.5 | 37.5 | 37.5 | 37.5 |
| Glycol-based solvent (H) | Ethylene glycol | | | | | | | | | |
| | Diethylene glycol | | | | | | | | | |
| | 1,3-Propanediol | | | | | | | | | |
| | Propylene glycol | 28 | 28 | 28 | 28 | 28 | 28 | 28 | 28 | 28 |
| | 1,2-butanediol | | | | | | | | | |
| | 1,2-Hexanediol | | | | | | | | | |
| | 1,6-Hexanediol | | | | | | | | | |
| Ethylene glycol ether-based solvent (I) | Ethyl diglycol | | | | | | | | | |
| | Butyl diglycol | | | | | | | | | |
| | Hexyl diglycol | 2 | 2 | 2 | 2 | 2 | 2 | 2 | 2 | 2 |
| | Methyl triglycol | | | | | | | | | |
| | Triethylene glycol dimethyl ether | | | | | | | | | |
| | Tetraethylene glycol dimethyl ether | | | | | | | | | |
| Other solvents | 2-Pyrrolidone | | | | | | | | | |
| | ε-caprolactam | | | | | | | | | |
| | N,N-dimethylformamide | | | | | | | | | |
| | EQUAMIDE M-100 (manufactured by Idemitsu Kosan Co., Ltd.) | | | | | | | | | |

| Ink composition | | Example 10 | Example 11 | Example 12 | Example 13 | Example 14 | Example 15 | Example 16 |
|---|---|---|---|---|---|---|---|---|
| Resin fine particles used | | Synthesis Example 10 | Synthesis Example 11 | Synthesis Example 12 | Synthesis Example 13 | Synthesis Example 14 | Synthesis Example 15 | Synthesis Example 16 |
| Aqueous dispersion of resin fine particles | | 12.5 | 12.5 | 12.5 | 12.5 | 12.5 | 12.5 | 12.5 |
| Pigment dispersion liquid | | 20 | 20 | 20 | 20 | 20 | 20 | 20 |
| Purified water | | 37.5 | 37.5 | 37.5 | 37.5 | 37.5 | 37.5 | 37.5 |
| Glycol-based solvent (H) | Ethylene glycol | | | | | | | |
| | Diethylene glycol | | | | | | | |
| | 1,3-Propanediol | | | | | | | |
| | Propylene glycol | 28 | 28 | 28 | 28 | 28 | 28 | 28 |
| | 1,2-butanediol | | | | | | | |
| | 1,2-Hexanediol | | | | | | | |
| | 1,6-Hexanediol | | | | | | | |
| Ethylene glycol ether-based solvent (I) | Ethyl diglycol | | | | | | | |
| | Butyl diglycol | | | | | | | |
| | Hexyl diglycol | 2 | 2 | 2 | 2 | 2 | 2 | 2 |
| | Methyl triglycol | | | | | | | |
| | Triethylene glycol dimethyl ether | | | | | | | |
| | Tetraethylene glycol dimethyl ether | | | | | | | |
| Other solvents | 2-Pyrrolidone | | | | | | | |
| | ε-caprolactam | | | | | | | |
| | N,N-dimethylformamide | | | | | | | |
| | EQUAMIDE M-100 (manufactured by Idemitsu Kosan Co., Ltd.) | | | | | | | |

TABLE 3-continued

| Ink composition | | Example 17 | Example 18 | Example 19 | Example 20 | Example 21 | Example 22 | Example 23 |
|---|---|---|---|---|---|---|---|---|
| Resin fine particles used | | Synthesis Example 17 | Synthesis Example 18 | Synthesis Example 19 | Synthesis Example 20 | Synthesis Example 21 | Synthesis Example 22 | Synthesis Example 23 |
| Aqueous dispersion of resin fine particles | | 12.5 | 12.5 | 12.5 | 12.5 | 12.5 | 12.5 | 12.5 |
| Pigment dispersion liquid | | 20 | 20 | 20 | 20 | 20 | 20 | 20 |
| Purified water | | 37.5 | 37.5 | 32.5 | 32.5 | 27.5 | 39.5 | 39.5 |
| Glycol-based solvent (H) | Ethylene glycol | | | | | | | |
| | Diethylene glycol | | | | | | | |
| | 1,3-Propanediol | | | 30.0 | | | | |
| | Propylene glycol | 28 | 28 | | | | | |
| | 1,2-butanediol | | | | 15 | 25 | | |
| | 1,2-Hexanediol | | | | | | 10 | |
| | 1,6-Hexanediol | | | | | | | 10 |
| Ethylene glycol ether-based solvent (I) | Ethyl diglycol | | | | | | | |
| | Butyl diglycol | | | 5 | | | | |
| | Hexyl diglycol | 2 | 2 | | | | | |
| | Methyl triglycol | | | | | | 18 | 18 |
| | Triethylene glycol dimethyl ether | | | | | | | |
| | Tetraethylene glycol dimethyl ether | | | | 10 | 5 | | |
| Other solvents | 2-Pyrrolidone | | | | 10 | 5 | | |
| | ε-caprolactam | | | | | | | |
| | N,N-dimethylformamide | | | | | | | |
| | EQUAMIDE M-100 (manufactured by Idemitsu Kosan Co., Ltd.) | | | | | 5 | | |

| Ink composition | | Example 24 | Example 25 | Example 26 | Example 27 | Example 28 | Example 29 | Example 30 |
|---|---|---|---|---|---|---|---|---|
| Resin fine particles used | | Synthesis Example 24 | Synthesis Example 25 | Synthesis Example 26 | Synthesis Example 27 | Synthesis Example 28 | Synthesis Example 29 | Synthesis Example 30 |
| Aqueous dispersion of resin fine particles | | 12.5 | 12.5 | 12.5 | 12.5 | 12.5 | 12.5 | 12.5 |
| Pigment dispersion liquid | | 20 | 20 | 20 | 20 | 20 | 20 | 20 |
| Purified water | | 34.5 | 34.5 | 27.5 | 32.5 | 32.5 | 20.0 | 20.0 |
| Glycol-based solvent (H) | Ethylene glycol | | | 20 | | | 20 | 20 |
| | Diethylene glycol | | | | | | 20 | 20 |
| | 1,3-Propanediol | | | | | | | |
| | Propylene glycol | 8 | 8 | | | 10 | | |
| | 1,2-butanediol | | | | 20 | | | |
| | 1,2-Hexanediol | | | | | | | |
| | 1,6-Hexanediol | | | 10 | | | 2 | 2 |
| Ethylene glycol ether-based solvent (I) | Ethyl diglycol | | | | 10 | 15 | | |
| | Butyl diglycol | | 15 | | 5 | | | |
| | Hexyl diglycol | | | 5 | | | | |
| | Methyl triglycol | | | | | | | |
| | Triethylene glycol dimethyl ether | 15 | | | | | | 0.5 |
| | Tetraethylene glycol dimethyl ether | | | | | | 0.5 | |
| Other solvents | 2-Pyrrolidone | | | | | | | |
| | ε-caprolactam | 10 | 10 | | | | | |
| | N,N-dimethylformamide | | | 5 | | | | |
| | EQUAMIDE M-100 (manufactured by Idemitsu Kosan Co., Ltd.) | | | | | | 10 | 5 | 5 |

TABLE 4

| Ink composition | | Comparative example 1 | Comparative example 2 | Comparative example 3 | Comparative example 4 | Comparative example 5 | Comparative example 6 | Comparative example 7 |
|---|---|---|---|---|---|---|---|---|
| Resin fine particles used | | Synthesis Example 19 | Synthesis Example 20 | Synthesis Example 21 | Synthesis Example 22 | Synthesis Example 23 | Synthesis Example 24 | Synthesis Example 25 |
| Aqueous dispersion of resin fine particles | | 125 | 125 | 125 | 125 | 125 | 125 | 125 |
| Pigment dispersion liquid | | 20 | 20 | 20 | 20 | 20 | 20 | 20 |
| Purified water | | 37.5 | 37.5 | 37.5 | 37.5 | 37.5 | 37.5 | 37.5 |
| Glycol-based solvent (H) | Ethylene glycol | | | | | | | |
| | Diethylene glycol | | | | | | | |
| | 1,3-Propanediol | | | | | | | |

TABLE 4-continued

| | | | | | | | | |
|---|---|---|---|---|---|---|---|---|
| | Propylene glycol | 28 | 28 | 28 | 28 | 28 | 28 | 28 |
| | 1,2-butanediol | | | | | | | |
| | 1,2-Hexanediol | | | | | | | |
| | 1,6-Hexanediol | | | | | | | |
| Ethylene glycol ether-based solvent (I) | Ethyl diglycol | | | | | | | |
| | Butyl diglycol | | | | | | | |
| | Hexyl diglycol | 2 | 2 | 2 | 2 | 2 | 2 | 2 |
| | Methyl triglycol | | | | | | | |
| | Triethylene glycol dimethyl ether | | | | | | | |
| | Tetraethylene glycol dimethyl ether | | | | | | | |
| Other solvents | 2-Pyrrolidone | | | | | | | |
| | ε-caprolactam | | | | | | | |
| | N,N-dimethylformamide | | | | | | | |
| | EQUAMIDE M-100 (manufactured by Idemitsu Kosan Co., Ltd.) | | | | | | | |

| Ink composition | | Comparative example 8 | Comparative example 9 | Comparative example 10 | Comparative example 11 | Comparative example 12 | Comparative example 13 | Comparative example 14 |
|---|---|---|---|---|---|---|---|---|
| Resin fine particles used | | Synthesis Example 26 | Synthesis Example 27 | Synthesis Example 28 | Synthesis Example 29 | Synthesis Example 30 | Synthesis Example 31 | Synthesis Example 32 |
| Aqueous dispersion of resin fine particles | | 125 | 125 | 125 | 125 | 125 | 125 | 12.5 |
| Pigment dispersion liquid | | 20 | 20 | 20 | 20 | 20 | 20 | 20 |
| Purified water | | 37.5 | 37.5 | 37.5 | 37.5 | 37.5 | 37.5 | 37.5 |
| Glycol-based solvent (H) | Ethylene glycol | | | | | | | |
| | Diethylene glycol | | | | | | | |
| | 1,3-Propanediol | | | | | | | |
| | Propylene glycol | 28 | 28 | 28 | 28 | 28 | 28 | 28 |
| | 1,2-butanediol | | | | | | | |
| | 1,2-Hexanediol | | | | | | | |
| | 1,6-Hexanediol | | | | | | | |
| Ethylene glycol ether-based solvent (I) | Ethyl diglycol | | | | | | | |
| | Butyl diglycol | | | | | | | |
| | Hexyl diglycol | 2 | 2 | 2 | 2 | 2 | 2 | 2 |
| | Methyl triglycol | | | | | | | |
| | Triethylene glycol dimethyl ether | | | | | | | |
| | Tetraethylene glycol dimethyl ether | | | | | | | |
| Other solvents | 2-Pyrrolidone | | | | | | | |
| | ε-caprolactam | | | | | | | |
| | N,N-dimethylformamide | | | | | | | |
| | EQUAMIDE M-100 (manufactured by Idemitsu Kosan Co., Ltd.) | | | | | | | |

| Ink composition | | Comparative example 15 | Comparative example 16 | Comparative example 17 | Comparative example 18 | Comparative example 19 | Comparative example 20 | Comparative example 21 | Comparative example 22 |
|---|---|---|---|---|---|---|---|---|---|
| Resin fine particles used | | Synthesis Example 33 | Synthesis Example 34 | Synthesis Example1 | Synthesis Example 1 | Synthesis Example 1 | Synthesis Example 1 | Synthesis Example 1 | Synthesis Example 1 |
| Aqueous dispersion of resin fine particles | | 12.5 | 12.5 | 12.5 | 12.5 | 12.5 | 12.5 | 12.5 | 12.5 |
| Pigment dispersion liquid | | 20 | 20 | 20 | 20 | 20 | 20 | 20 | 20 |
| Purified water | | 37.5 | 37.5 | 17.5 | 62.5 | 52.5 | 27.5 | 37.5 | 42.5 |
| Glycol-based solvent (H) | Ethylene glycol | | | | | | | | |
| | Diethylene glycol | | | | | | | | |
| | 1,3 Propanediol | | | | | | | | |
| | Propylene glycol | 28 | 28 | 50 | | | | 20 | |
| | 1,2-butanediol | | | | | | | | |
| | 1,2-Hexanediol | | | | | | | | |
| | 1,6-Hexanediol | | | | | | | | |
| Ethylene glycol ether-based solvent (I) | Ethyl diglycol | | | | | | | | |
| | Butyl diglycol | | | | | | | | |
| | Hexyl diglycol | 2 | 2 | | 5 | | | | |
| | Methyl triglycol | | | | | | | 20 | |
| | Triethylene glycol dimethyl ether | | | | | | | | |
| | Tetraethylene glycol dimethyl ether | | | | | 15 | | | |

TABLE 4-continued

| | | | |
|---|---|---|---|
| Other solvents | 2-Pyrrolidone | 20 | 20 |
| | ε-caprolactam | | |
| | N,N-dimethylformamide | | 5 |
| | EQUAMIDE M-100 (manufactured by Idemitsu Kosan Co., Ltd.) | 10 | |

[Evaluation of Aqueous Inkjet Ink Composition]

The aqueous inkjet ink compositions of four colors prepared as described above were filled in a solvent ink inkjet printer, Color Painter 64Splus, manufactured by Seiko I Infotech, Inc. in an environment at 25° C., and images were printed on substrates. For the ink compositions, storage stability, and ejectability were evaluated. After printing, the substrates were heat treated at 80° C. for about 3 minutes, and thus printed materials for evaluation were obtained. Various coating film properties such as printing suitability, gloss, brightness, adhesiveness, scratch resistance, water resistance, and solvent resistance were evaluated by using those printed materials. The results are presented in Table 5 and Table 6.

[Storage Stability]

For the aqueous inkjet ink compositions, changes over time in the viscosity under the conditions of 70° C. for 2 weeks were evaluated. The viscosity was measured by using a rheometer (AR-2000 manufactured by TA Instruments, Inc.). The evaluation criteria are as follows.

⊚: The change in the viscosity of the ink is less than ±10%.
○: The change in the viscosity of the ink is equal to or greater than ±10% and less than ±15%.
Δ: The change in the viscosity of the ink is equal to or greater than ±15% and less than ±20%.
X: The change in the viscosity of the ink is equal to or greater than ±20%.

[Ejectability]

In the printer described above, the time taken by the ink to dry during the standby for printing (room temperature, a state in which fresh ink was not supplied) and cause nozzle clogging was evaluated. The term nozzle clogging as used herein refers to the state in which nozzles are filled with ink during the standby for printing, and printing cannot be achieved. If nozzle clogging is absent, ejectability can be said to be satisfactory. The evaluation criteria are as follows.

⊚: Nozzle clogging does not occur in 60 minutes.
○: Nozzle clogging occurs in 60 minutes.
Δ: Nozzle clogging occurs in 30 minutes.
X: Nozzle clogging occurs in 10 minutes.

[Printing Suitability]

Printing was carried out on coated paper (OK TOPCOAT+ manufactured by Oji Paper Co., Ltd.) and vinyl chloride sheets (MD5 manufactured by METAMARK, Ltd.) by using the printer described above. Printed samples were observed with a magnifying glass, and the connection of dots, color unevenness and the like were evaluated. The evaluation criteria are as follows.

○: The printing quality is satisfactory.
Δ: The printing quality is satisfactory to some extent.
X: The printing quality is not satisfactory.

[Gloss]

For a printed material for evaluation (coated paper, black ink), the 60° gloss was measured with a gloss meter (Micro-TRI-gloss manufactured by BYK Gardner, Inc.). The evaluation criteria are as follows.

⊚: The gloss is equal to or higher than 100.
○: The gloss is equal to or higher than 70 and lower than 100.
Δ: The gloss is equal to or higher than 55 and lower than 70.
X: The gloss is lower than 55.

[Brightness]

For a printed material for evaluation (coated paper, black ink), the brightness (L value) was measured with a color difference meter (SE 2000 manufactured by Nippon Denshoku Industries Co., Ltd.). The evaluation criteria are as follows.

○: The L value is less than 8.5.
Δ: The L value is equal to or greater than 8.5 and less than 10.
X: The L value is equal to or greater than 10.

[Adhesiveness]

A cellophane tape was attached on the printed surface of a printed material for evaluation (coated paper), and then the cellophane tape was peeled at a low speed. The evaluation criteria are as follows.

○: Peelings are not adhering to the cellophane tape.
X: Peelings are adhering to the cellophane tape.

[Scratch Resistance]

The printed surface of a printed material for evaluation (coated paper) were rubbed with a colorfastness rubbing tester (AB-301 manufactured by Tester Sangyo Co., Ltd.) by 50 reciprocations under the conditions of a load of 200 g/cm² (the contact surface was coated paper), and thereby the scratch of the printed surface was evaluated. The evaluation criteria are as follows.

○: The printed surface is in a state without any scratches.
Δ: The printed surface has scratches, but the substrate is not visible.
X: The printed surface has many scratches, and the substrate is visible.

[Water Resistance and Solvent Resistance]

A cotton swab was immersed in any one of water, a water/ethanol solvent mixture (weight ratio: 50/50), and ethanol, and the printed surface of a printed material for evaluation (coated paper) was rubbed with the cotton swab for about 5 reciprocations. The evaluation criteria are as follows.

○: No erosion occurred, and the cotton swab does not have any ink adhering thereto.
Δ: The cotton swab has ink adhering thereto, but the substrate surface is not visible.
X: The cotton swab has ink adhering thereto, and the substrate surface is also visible.

TABLE 5

| | | Example 1 | Example 2 | Example 3 | Example 4 | Example 5 | Example 6 | Example 7 | Example 8 | Example 9 |
|---|---|---|---|---|---|---|---|---|---|---|
| Ink properties | Storage stability | ⊙ | ⊙ | ○ | ○ | ⊙ | ⊙ | ⊙ | ⊙ | ⊙ |
| | Ejectability | ⊙ | ⊙ | ○ | ○ | ⊙ | ⊙ | ⊙ | ⊙ | ⊙ |
| Properties of printed material | Printing suitability (coated paper) | ○ | ○ | ○ | ○ | ○ | ○ | ○ | ○ | ○ |
| | Printing suitability (vinyl chloride) | ○ | ○ | ○ | ○ | ○ | ○ | ○ | ○ | ○ |
| | Gloss (coated paper/black) | ⊙ | ⊙ | ⊙ | ⊙ | ⊙ | ⊙ | ⊙ | ⊙ | ⊙ |
| | Brightness (coated paper/black) | ⊙ | ⊙ | ⊙ | ⊙ | ⊙ | ⊙ | ⊙ | ⊙ | ⊙ |
| | Adhesiveness (coated paper) | ○ | ○ | ○ | ○ | ○ | ○ | ○ | ○ | ○ |
| | Scratch resistance (coated paper) | ○ | ○ | ○ | ○ | ○ | Δ | ○ | Δ | ○ |
| | Water resistance (coated paper) | ○ | ○ | ○ | ○ | ○ | ○ | ○ | ○ | ○ |
| | Water/ethanol resistance (coated paper) | ○ | ○ | ○ | ○ | ○ | ○ | ○ | ○ | ○ |
| | Ethanol resistance (coated paper) | ○ | ○ | ○ | ○ | ○ | ○ | ○ | ○ | ○ |

| | | Example 10 | Example 11 | Example 12 | Example 13 | Example 14 | Example 15 | Example 16 |
|---|---|---|---|---|---|---|---|---|
| Ink properties | Storage stability | ⊙ | ⊙ | ⊙ | ⊙ | ○ | ⊙ | ⊙ |
| | Ejectability | ⊙ | ⊙ | ⊙ | ⊙ | ⊙ | ⊙ | ⊙ |
| Properties of printed material | Printing suitability (coated paper) | ○ | ○ | ○ | ○ | ○ | ○ | ○ |
| | Printing suitability (vinyl chloride) | ○ | ○ | ○ | ○ | ○ | ○ | ○ |
| | Gloss (coated paper/black) | ⊙ | ⊙ | ⊙ | ⊙ | ⊙ | ⊙ | ○ |
| | Brightness (coated paper/black) | ⊙ | ⊙ | ⊙ | ⊙ | ⊙ | ⊙ | ○ |
| | Adhesiveness (coated paper) | ○ | ○ | ○ | ○ | ○ | ○ | ○ |
| | Scratch resistance (coated paper) | Δ | Δ | ○ | Δ | ○ | ○ | ○ |
| | Water resistance (coated paper) | ○ | ○ | ○ | ○ | ○ | ○ | ○ |
| | Water/ethanol resistance (coated paper) | ○ | ○ | ○ | ○ | ○ | ○ | ○ |
| | Ethanol resistance (coated paper) | ○ | ○ | ○ | ○ | ○ | ○ | ○ |

| | | Example 17 | Example 18 | Example 19 | Example 20 | Example 21 | Example 22 | Example 23 |
|---|---|---|---|---|---|---|---|---|
| Ink properties | Storage stability | ⊙ | ⊙ | ⊙ | ⊙ | ⊙ | ⊙ | ⊙ |
| | Ejectability | ○ | ○ | ⊙ | ⊙ | ⊙ | ○ | ○ |
| Properties of printed material | Printing suitability (coated paper) | ○ | ○ | ○ | ○ | ○ | ○ | ○ |
| | Printing suitability (vinyl chloride) | ○ | ○ | ○ | ○ | ○ | ○ | ○ |
| | Gloss (coated paper/black) | ⊙ | ⊙ | ⊙ | ⊙ | ⊙ | ⊙ | ⊙ |
| | Brightness (coated paper/black) | ⊙ | ⊙ | ⊙ | ⊙ | ⊙ | ⊙ | ⊙ |
| | Adhesiveness (coated paper) | ○ | ○ | ○ | ○ | ○ | ○ | ○ |
| | Scratch resistance (coated paper) | ○ | ○ | ○ | ○ | ○ | ○ | ○ |
| | Water resistance (coated paper) | ○ | ○ | ○ | ○ | ○ | ○ | ○ |
| | Water/ethanol resistance (coated paper) | ○ | ○ | ○ | ○ | ○ | ○ | ○ |
| | Ethanol resistance (coated paper) | ○ | ○ | ○ | ○ | ○ | ○ | ○ |

| | | Example 24 | Example 25 | Example 26 | Example 27 | Example 28 | Example 29 | Example 30 |
|---|---|---|---|---|---|---|---|---|
| Ink properties | Storage stability | ⊙ | ⊙ | ⊙ | ⊙ | ⊙ | ⊙ | ⊙ |
| | Ejectability | ○ | ○ | ⊙ | ⊙ | ⊙ | ⊙ | ⊙ |
| Properties of printed material | Printing suitability (coated paper) | ○ | ○ | ○ | ○ | ○ | ○ | ○ |
| | Printing suitability (vinyl chloride) | ○ | ○ | ○ | ○ | ○ | ○ | ○ |

TABLE 5-continued

|  |  |  |  |  |  |  |  |
|---|---|---|---|---|---|---|---|
| Gloss (coated paper/black) | ◉ | ◉ | ◉ | ◉ | ◉ | ◉ | ◉ |
| Brightness (coated paper/black) | ◉ | ◉ | ◉ | ◉ | ◉ | ◉ | ◉ |
| Adhesiveness (coated paper) | ○ | ○ | ○ | ○ | ○ | ○ | ○ |
| Scratch resistance (coated paper) | ○ | ○ | ○ | ○ | ○ | Δ | Δ |
| Water resistance (coated paper) | ○ | ○ | ○ | ○ | ○ | ○ | ○ |
| Water/ethanol resistance (coated paper) | ○ | ○ | ○ | ○ | ○ | ○ | ○ |
| Ethanol resistance (coated paper) | ○ | ○ | ○ | ○ | ○ | ○ | ○ |

TABLE 6

|  |  | Comparative example 1 | Comparative example 2 | Comparative example 3 | Comparative example 4 | Comparative example 5 | Comparative example 6 | Comparative example 7 |
|---|---|---|---|---|---|---|---|---|
| Ink properties | Storage stability | ◉ | ◉ | X | X | X | X | X |
|  | Ejectability | X | X | X | X | X | Δ | Δ |
| Properties of printed material | Printing suitability (coated paper) | ○ | ○ | ○ | ○ | ○ | ○ | ○ |
|  | Printing suitability (vinyl chloride) | ○ | ○ | ○ | ○ | ○ | ○ | ○ |
|  | Gloss (coated paper/black) | Δ | Δ | ◉ | Δ | Δ | ◉ | ◉ |
|  | Brightness (coated paper/black) | Δ | Δ | ◉ | Δ | Δ | ◉ | ◉ |
|  | Adhesiveness (coated paper) | ○ | ○ | ○ | ○ | ○ | ○ | ○ |
|  | Scratch resistance (coated paper) | ○ | Δ | ○ | Δ | Δ | ○ | ○ |
|  | Water resistance (coated paper) | Δ | ○ | ○ | ○ | ○ | ○ | ○ |
|  | Water/ethanol resistance (coated paper) | ○ | ○ | ○ | ○ | ○ | ○ | ○ |
|  | Ethanol resistance (coated paper) | ○ | ○ | ○ | ○ | ○ | ○ | ○ |

|  |  | Comparative example 8 | Comparative example 9 | Comparative example 10 | Comparative example 11 | Comparative example 12 | Comparative example 13 | Comparative example 14 |
|---|---|---|---|---|---|---|---|---|
| Ink properties | Storage stability | X | X | ◉ | ○ | Δ | ◉ | ◉ |
|  | Ejectability | X | X | X | X | X | X | Δ |
| Properties of printed material | Printing suitability (coated paper) | ○ | ○ | ○ | ○ | ○ | Δ | ○ |
|  | Printing suitability (vinyl chloride) | ○ | ○ | ○ | ○ | ○ | Δ | ○ |
|  | Gloss (coated paper/black) | ◉ | ◉ | Δ | ◉ | ◉ | ○ | ◉ |
|  | Brightness (coated paper/black) | ◉ | ◉ | Δ | ◉ | ◉ | ○ | ◉ |
|  | Adhesiveness (coated paper) | ○ | ○ | ○ | ○ | ○ | ○ | ○ |
|  | Scratch resistance (coated paper) | ○ | ○ | Δ | ○ | ○ | ○ | ○ |
|  | Water resistance (coated paper) | ○ | ○ | ○ | ○ | ○ | Δ | ○ |
|  | Water/ethanol resistance (coated paper) | ○ | ○ | ○ | ○ | ○ | X | Δ |
|  | Ethanol resistance (coated paper) | ○ | ○ | ○ | ○ | ○ | X | X |

|  |  | Comparative example 15 | Comparative example 16 | Comparative example 17 | Comparative example 18 | Comparative example 19 | Comparative example 20 | Comparative example 21 | Comparative example 22 |
|---|---|---|---|---|---|---|---|---|---|
| Ink properties | Storage stability | ○ | ○ | ◉ | Δ | X | ◉ | X | ○ |
|  | Ejectability | X | X | Δ | X | X | ○ | X | X |
| Properties of printed material | Printing suitability (coated paper) | Δ | Δ | X | X | Δ | X | Δ | X |
|  | Printing suitability (vinyl chloride) | Δ | Δ | X | X | Δ | X | Δ | X |
|  | Gloss (coated paper/black) | ○ | ○ | Δ | ○ | ○ | ○ | ○ | ○ |
|  | Brightness (coated paper/black) | ○ | ○ | Δ | ○ | ○ | ○ | ○ | ○ |

TABLE 6-continued

| | | | | | | | | |
|---|---|---|---|---|---|---|---|---|
| Adhesiveness (coated paper) | ○ | ○ | X | ○ | ○ | ○ | ○ | ○ |
| Scratch resistance (coated paper) | Δ | Δ | X | ○ | ○ | ○ | ○ | ○ |
| Water resistance (coated paper) | ○ | ○ | Δ | ○ | ○ | ○ | ○ | ○ |
| Water/ethanol resistance (coated paper) | Δ | Δ | Δ | ○ | ○ | ○ | ○ | ○ |
| Ethanol resistance (coated paper) | Δ | Δ | Δ | ○ | ○ | ○ | ○ | ○ |

As can be seen from Table 5 and Table 6, it was found that the aqueous inkjet ink compositions of Examples 1 to 30 are excellent in all of the ink properties (storage stability and ejectability), printing suitability, gloss and brightness of printed materials, and various coating film properties (adhesiveness, scratch resistance, water resistance, and solvent resistance).

On the other hand, the aqueous inkjet ink compositions of Comparative examples 1 to 13, 15, 16, 18, 19, 21 and 22 exhibited very poor ink properties. Furthermore, the aqueous inkjet ink compositions of Comparative Examples 17, 18, 20 and 22 exhibited very poor printing suitability. Furthermore, the aqueous inkjet ink composition of Comparative Examples 13, 14 and 17 exhibited very poor coating film properties.

The invention claimed is:

1. An aqueous inkjet ink composition comprising a pigment, a pigment-dispersing resin, resin fine particles (A), water, and hydrophilic solvents (B),
    wherein the resin fine particles (A) is formed by emulsion polymerizing ethylenically unsaturated monomers including:
    20% to 80% by weight of an aromatic ethylenically unsaturated monomer (C) that does not have an ionic functional group;
    0.6% to 6% by weight of water-soluble ethylenically unsaturated monomers (F) consisting of 0.5% to 3% by weight of a sulfonic acid group-containing ethylenically unsaturated monomer (D) and 0.1% to 3% by weight of a nonionic water-soluble ethylenically unsaturated monomer (E), wherein the sulfonic acid group-containing ethylenically unsaturated monomer (D) is a styrenesulfonic acid group-containing ethylenically unsaturated monomer; and
    0.1% to 10% by weight of a crosslinkable ethylenically unsaturated monomer (G), wherein the crosslinkable ethylenically unsaturated monomer (G) is a monomer having two or more allyl groups,
    wherein an average particle size of the resin fine particles (A) is from 73 nm to 250 nm, and the amount of coarse particles having a particle size of 1 μm or greater in an aqueous dispersion of the resin fine particles (A) at a solid concentration of 30 ppm is $4 \times 10^4$ particles/cm$^3$ or less, and
    wherein the hydrophilic solvents (B) include a glycol-based solvent (H) and an ethylene glycol ether-based solvent (I).

2. The aqueous inkjet ink composition according to claim 1, wherein the average particle size of the resin fine particles (A) is from 86 nm to 250 nm.

3. The aqueous inkjet ink composition according to claim 1, wherein a glass transition temperature of the resin fine particles (A) is 40° C. to 120° C.

4. The aqueous inkjet ink composition according to claim 1, wherein a viscosity of an aqueous dispersion of the resin fine particles (A) measured under conditions of a temperature of 25° C. and a solid concentration of 40% by weight is 5 mPa·s to 200 mPa·s.

5. The aqueous inkjet ink composition according to claim 1, wherein the average particle size of the resin fine particles (A) is from 100 nm to 250 nm.

* * * * *